US010268036B1

(12) United States Patent
Schultz et al.

(10) Patent No.: US 10,268,036 B1
(45) Date of Patent: Apr. 23, 2019

(54) ELECTROWETTING CELL WITH STEPPED LATERAL WALL ELECTRODES

(71) Applicant: ABL IP HOLDING LLC, Conyers, GA (US)

(72) Inventors: Alexander Jacob Schultz, Sterling, VA (US); James Michael Phipps, Fairfax, VA (US); John M. Reilly, Leesburg, VA (US); Steve Lyons, Herndon, VA (US); An Mao, Jersey City, NJ (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/842,072

(22) Filed: Dec. 14, 2017

(51) Int. Cl.
    *G02B 3/14* (2006.01)
    *G02B 5/06* (2006.01)
    *G02B 26/00* (2006.01)

(52) U.S. Cl.
    CPC .............. *G02B 26/005* (2013.01); *G02B 3/14* (2013.01); *G02B 5/06* (2013.01)

(58) Field of Classification Search
    CPC .. G02B 17/006; G02B 26/004; G02B 26/005; G02B 3/14; G02B 5/06
    USPC .................................................. 359/290, 291
    See application file for complete search history.

(56) References Cited

U.S. PATENT DOCUMENTS 8,514,474 B2 * 8/2013 Lee ...................... G02B 26/005
                                                       359/228
2018/0039070 A1    2/2018 Mao et al.

OTHER PUBLICATIONS

U.S. Appl. No. 15/479,857, filed Apr. 5, 2017, entitled "Electrowetting Assembly Technique and Cell Structure", 72 pages.
U.S. Appl. No. 15/661,742, filed Jul. 27, 2017, entitled "Sealing and Laterial Pressure Compensation Structures Usable With Fluidic or Gaseous Material Containers", 71 pages.
U.S. Appl. No. 15/674,040, filed Aug. 10, 2017, entitled "Electrowetting Cell Constructs", 55 pages.
U.S. Appl. No. 15/389,829, filed Dec. 23, 2016, entitled "Electrowetting Cellular Array and Luminaire Incorporating the Array", 47 pages.

* cited by examiner

*Primary Examiner* — Collin X Beatty
(74) *Attorney, Agent, or Firm* — RatnerPrestia

(57) ABSTRACT

A system comprises a driver and an electrowetting cell controlled by the driver that includes a substrate that includes a well filled with at least two non-mixing media. The well has lateral walls and a stepped control channel electrode matrix including multiple stepped control channel electrode arrays. The lateral walls can collectively form a continuous perimeter around the well (e.g., circle shaped). Each stepped control channel electrode array includes a number of stepped control channel electrodes formed at different longitudinal levels along a respective lateral wall. Each stepped control channel electrode is independently controllable to control a shape of the at least two non-mixing media via an electric field. Each lateral wall encloses the at least two non-mixing media inside the well.

20 Claims, 21 Drawing Sheets

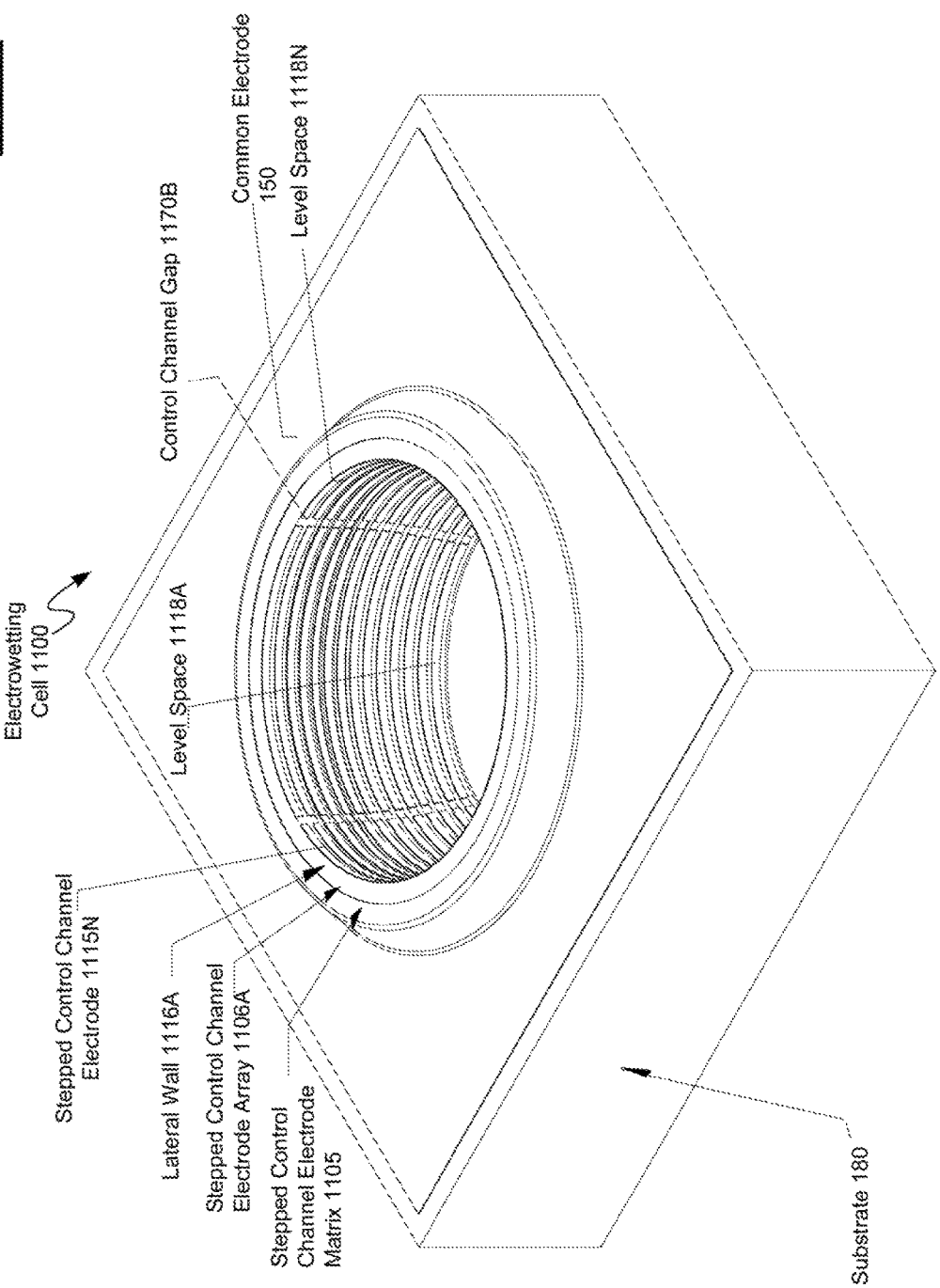

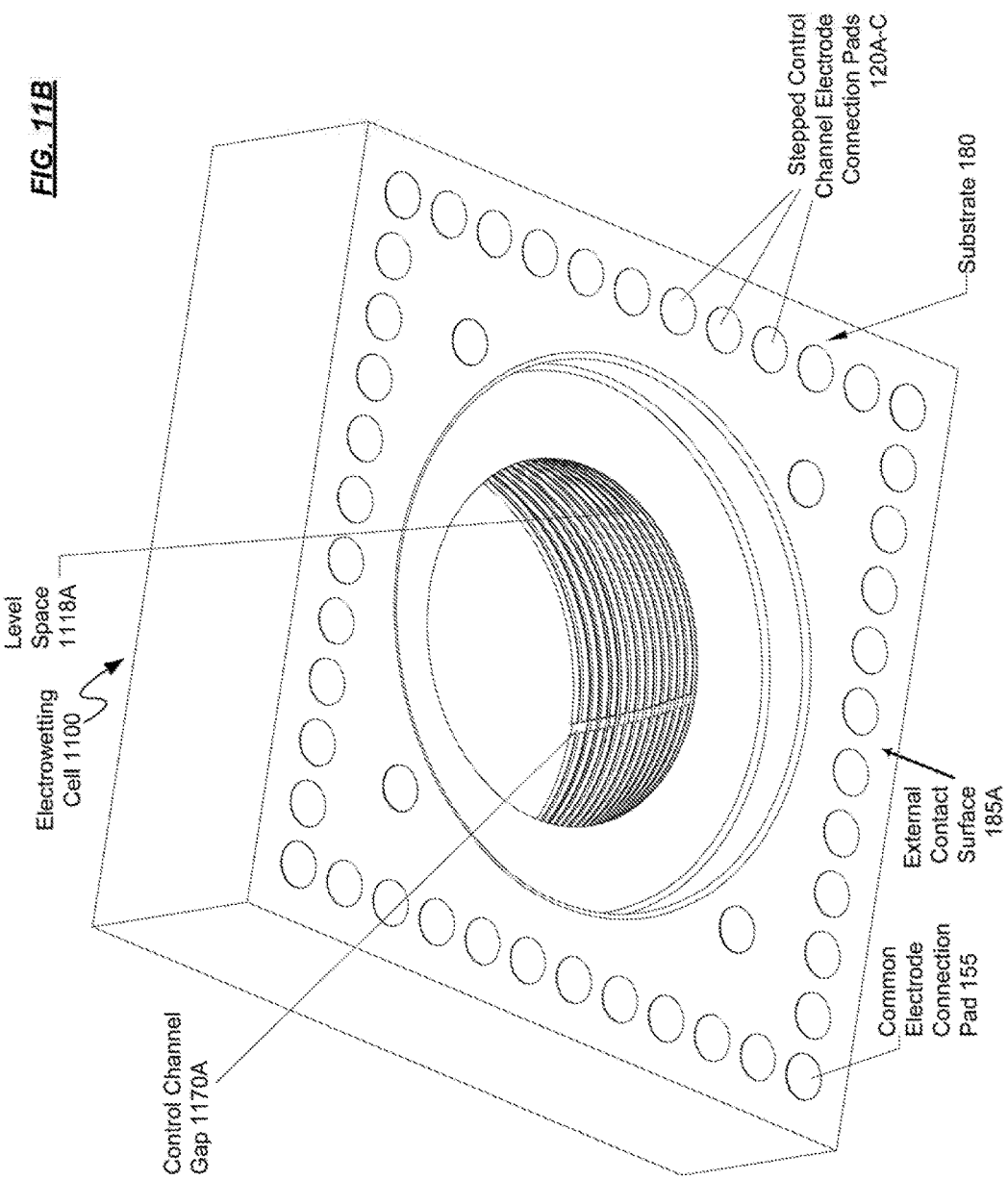

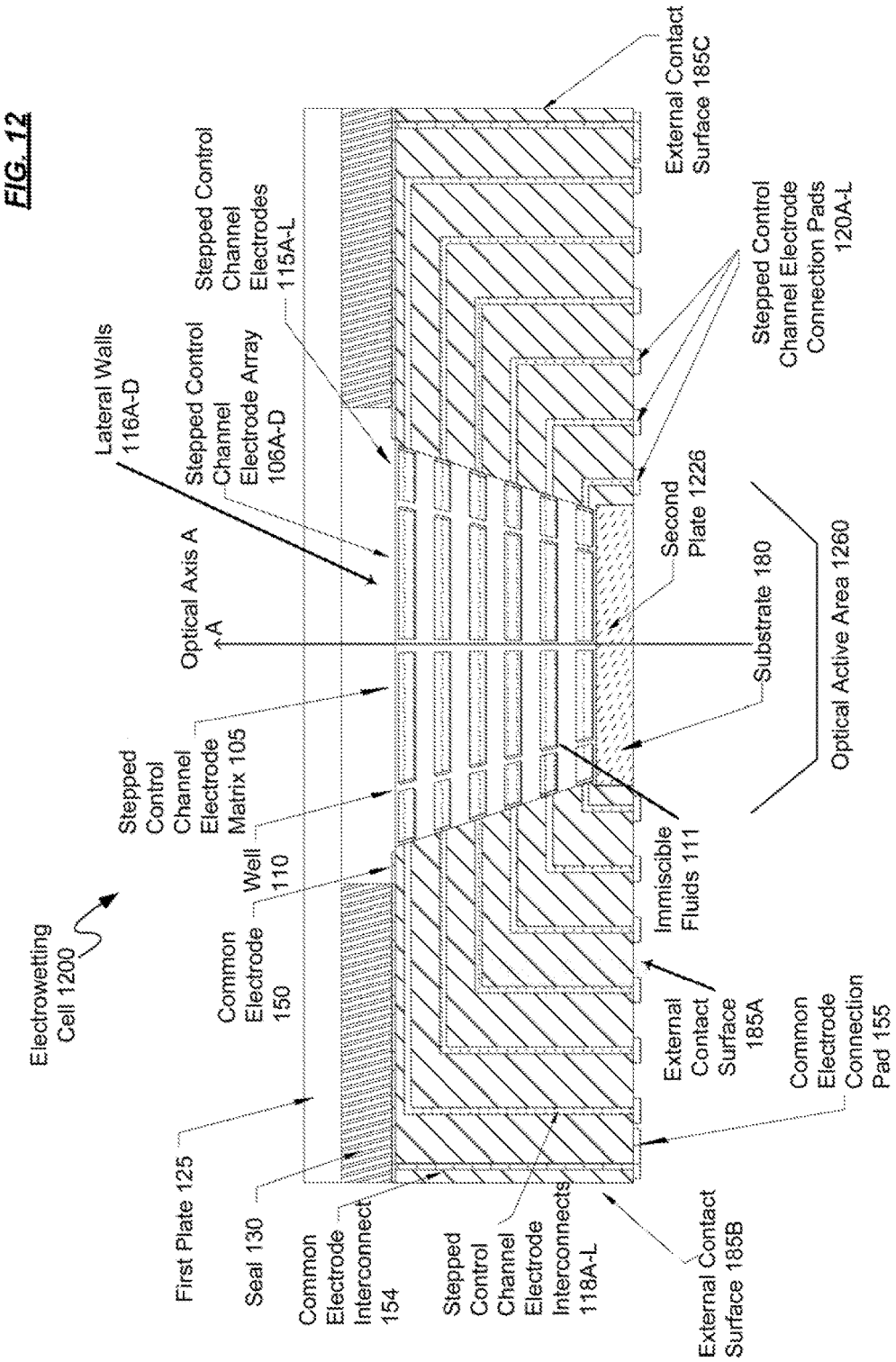

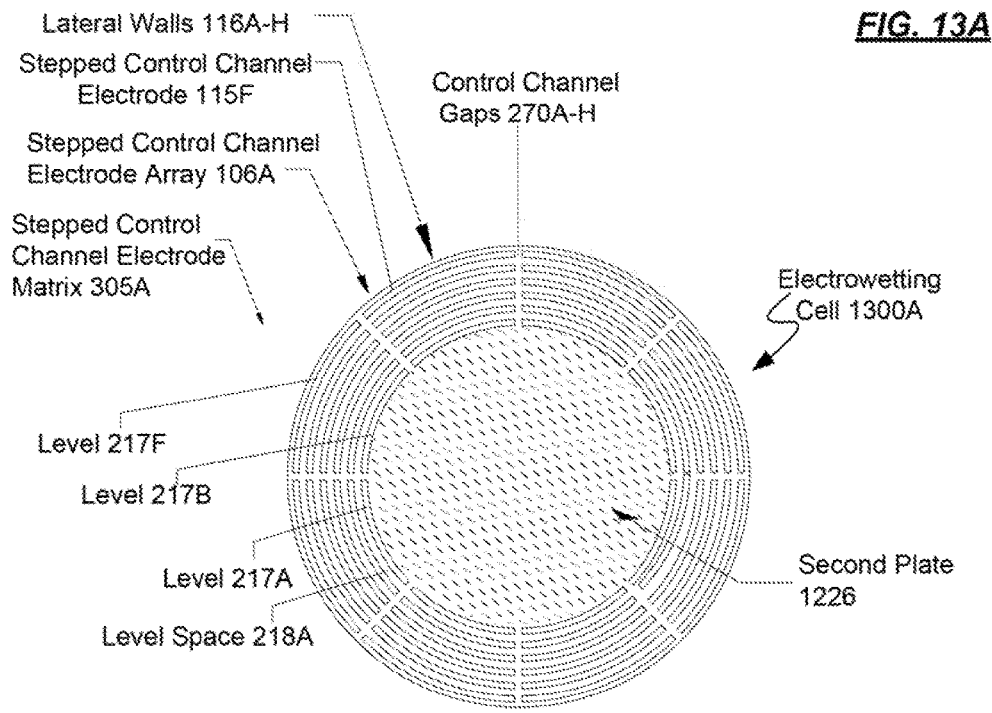
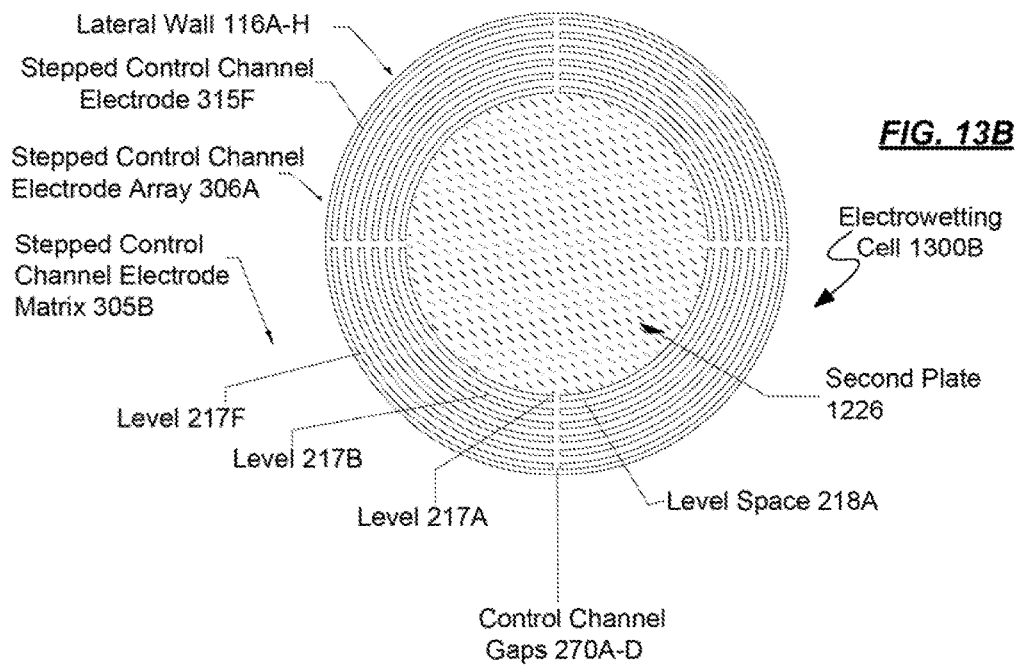

ELECTROWETTING CELL WITH STEPPED LATERAL WALL ELECTRODES

TECHNICAL FIELD

The present subject matter relates to driving techniques and electrode constructs for an electrowetting cell, e.g., fluid lens or prism, for beam shaping or steering applications.

BACKGROUND

Electrowetting is a microfluidic phenomenon that modifies the shape of a liquid in relation to a surface by applying an electrical field, e.g. by applying a voltage across two electrodes. For example, if the surface is hydrophobic, the electrical field causes a change in the shape of the liquid that appears to change the wetting properties of the hydrophobic surface. If the fluid(s) in an electrowetting cell and some of the wall(s) around the fluid(s) in a well are sufficiently transparent, the electrowetting cell may be used as an electrically controllable optic. Such optics have recently been the subject of a widening scope of light processing applications, such as variable lenses, variable prisms, optical switches, displays, etc.

Electrowetting lenses provide controllable beam shaping. There have been proposals to develop variable optical prisms using electrowetting cell arrangements. An electrowetting optic may have various different shaped structures, e.g., round, square or rectangular. The overall working principle for either beam shaping or steering is the same—the voltage applied across the dielectric layer attracts or repels the conducting liquid so as to change the wetting area of the cell and thus the shape of the liquid(s) in the cell.

Constructs for electrowetting optics have typically used one or more control channel electrodes. In some examples, each of the control channel electrodes are longitudinally formed to span an entire height of a lateral side wall of the well with longitudinal channel gaps formed between. A common electrode is located, e.g. on or through an end plate, to contact the conductive fluid in the well. The control channel electrodes can be separately controlled with different analog voltages with a waveform to vary the amplitude to drive a conductive fluid further up or down the side wall of the well. Unfortunately, portions of a specific control channel electrode cannot be driven with different waveforms, meaning the exact same waveform is applied to the entire height of the side wall area or region associated with the specific control channel electrode. Amplitude control also typically requires varying higher driving voltage levels, which necessitates channel-to-channel electrical isolation, for example, using a transformer which is bulky, expensive, and slow.

Prior constructs for electrowetting optics typically use complex capacitive compensation techniques due to hysteretic effects and capacitive drift in-which the conductive fluid does not wet to the exact same location in the electrowetting cell even when the same driving voltage is applied. With amplitude controlled waveforms, a capacitive monitoring system monitors capacitance of the control channel electrodes for changes in expected capacitance levels due to these inherent effects. As capacitance of the control channel electrodes increases or decreases, the capacitive monitoring system adjusts the amplitude of the driving voltage accordingly.

SUMMARY

In an example, a system comprises a driver and an electrowetting cell controlled by the driver. The electrowetting cell includes a substrate that includes a well filled with at least two non-mixing media. The well has a plurality of lateral walls and a stepped control channel electrode matrix. The lateral walls can collectively form a continuous perimeter around the well (e.g., circle shaped). The stepped control channel electrode matrix includes a plurality of stepped control channel electrode arrays. Each stepped control channel electrode array includes a plurality of stepped control channel electrodes formed at different longitudinal levels along a respective lateral wall. Each stepped control channel electrode is independently controllable by the switching circuitry to control a shape of the at least two non-mixing media via an electric field.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 11A is a top perspective view of an electrowetting cell construct with a segmented layout of the stepped control channel electrode matrix.

FIG. 11B is a bottom perspective view of the electrowetting cell construct of FIG. 11A with various stepped control channel electrode connection pads and a common electrode connection pad formed on an external contact surface.

FIG. 12 is a cross-sectional view of an assembled transparent electrowetting cell construct.

FIG. 13A is a top view of the electrowetting cell construct of FIG. 12 illustrating a segmented layout of the stepped control channel electrode matrix.

FIG. 13B is a top view of the electrowetting cell construct of FIG. 12 illustrating another segmented layout of the stepped control channel electrode matrix.

DETAILED DESCRIPTION

Figure 1:
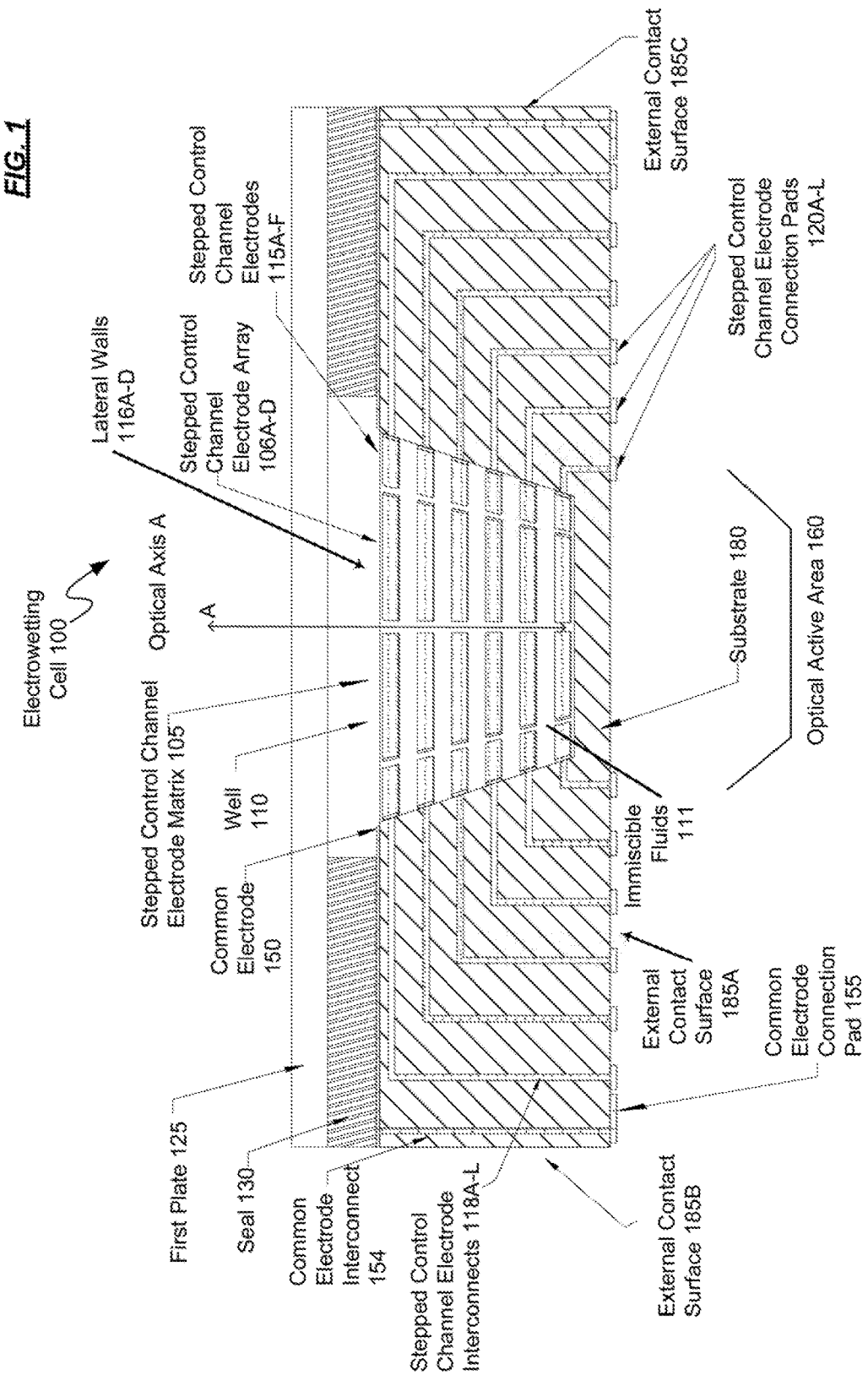
FIG. 1 is a cross-sectional view of an assembled electrowetting cell construct, including a substrate, a stepped control channel electrode matrix formed on lateral walls of a well, and a common electrode.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Different materials and fabrication techniques are disclosed herein that can lower the overall cost of electrowetting cells as well as provide different electrode designs that can require less costly electronic components and simplify the driving control schemes. For example, conductive layers can be fabricated between structural layers to create integrated electrodes and interconnections through the bulk of the substrate material instead of coating and patterning around the entire structure.

The techniques described herein are related to a multilayer printed circuit board (PCB) fabrication approach to create an electrowetting lens that has a stepped lateral wall (e.g., side wall) configuration. In an example, the stepped lateral wall can be segmented into separate, independently controlled electrodes up the vertical plane of the wall structure, as well as radially around the wall structure, as needed. The radial separation can provide two or more electrode sections to provide greater liquid lens geometry control. The control scheme can be simplified to a single high voltage source with on/off switched outputs (one per cell electrode). There may be no need for the ability to control the output amplitude, nor a need for channel-to-channel isolation, nor a need for capacitive feedback since there is an electro-physical fluid geometry stop.

Electrowetting is a fluidic phenomenon that enables changing of the configuration of a contained fluid system in response to an applied voltage. In general, application of an electric field seemingly modifies the wetting properties of a surface (e.g. the ability of fluid to maintain physical contact with a hydrophobic surface) in the fluid system. Assuming a two fluid system, where one fluid is relatively conductive, and the other is non-conductive; when a fluid is in contact with a surface and that surface becomes charged, the electric field tends to pull the mass of the electrically conductive fluid towards the surface. As the conductive fluid changes shape due to this force, the non-conductive fluid also changes shape. On a micro scale, the contact angle is unaffected. On a macro scale it seems that the wetting properties have changed. This phenomenon enables controlled changes to the overall distribution and shape of the fluids with respect to the surface, in response to changes of the voltage(s) applied to change the electric field.

Examples of electrowetting optics described in detail herein and shown in several of the drawings use two immiscible fluids having different electrical properties. In at least some examples, the two fluids have different indices of refraction. One fluid may be conductive. The other fluid, typically the fluid adjacent to a hydrophobic surface, may be non-conductive. The conductive fluid may be a transparent fluid, but the other fluid may be substantially transparent or transmissive. Where both fluids are transparent or transmissive, the non-conductive fluid may exhibit a higher index of refraction than the conductive fluid. However, this is not necessary. In some examples, the non-conductive fluid may exhibit a lower index of refraction than the conductive fluid.

Examples of electrowetting cells are disclosed in U.S. patent application Ser. No. 15/479,857, filed Apr. 5, 2017, entitled "Electrowetting Assembly Technique and Cell Structure"; and U.S. patent application Ser. No. 15/661,742, filed Jul. 27, 2017, entitled "Sealing and Lateral Pressure Compensation Structures Usable With Fluidic or Gaseous Material Containers"; and U.S. patent application Ser. No. 15/674,040, filed Aug. 10, 2017, entitled "Electrowetting Cell Constructs"; the entire contents of which are incorporated by reference herein.

In a transmissive electrowetting optic example using two fluids, changing the applied electric field changes the shape of the fluid interface surface between the two fluids and thus the refraction of the light passing through the interface surface, for example, so that the electrowetting optic operates as a variable shape lens and/or a variable shape prism. Depending on the application for the electrowetting optic, the light may enter the fluid system to pass first through either one or the other of the two fluids.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

The orientations of the electrowetting cells, associated components and/or any complete devices incorporating a cell such as shown in any of the drawings, are given by way of example only, for illustration and discussion purposes. In operation for a particular variable optical processing application, an electrowetting cell may be oriented in any other direction suitable to the particular application of the cell, for example up light or side light or any other orientation. Also, to the extent used herein, any directional term, such as lateral, longitudinal, up, down, upper, lower, top, bottom and side, are used by way of example only, and are not limiting as to direction or orientation of any optic or component of an optic constructed as otherwise described herein.

FIG. 1 is a cross-sectional view of an assembled electrowetting cell 100. As shown, the electrowetting cell 100 is reflective and includes a first plate 125 (e.g., cover plate), a substrate 180, a well 110 in the middle of the substrate 180, a stepped control channel electrode matrix 105, a common electrode 150, and various interconnects that can lead to external contact surfaces 185A-C, for example 185A, that is located outside the well 110 and around at least a portion of one end of the well 110 to provide electrical connection to the electrodes as depicted.

The stepped control channel electrode matrix 105 splits each stepped control channel electrode array 106A-D into multiple stepped control channel electrodes 115A-F, which are formed vertically in the example, utilizing printed circuit board (PCB) fabrication techniques. As described in more detail below, different driving methodologies besides amplitude modulation can be used that switch the stepped control channel electrodes 115A-F. Various interconnects and routing techniques, such as stepped control channel electrode interconnects 118A-L and common electrode interconnect 154 can be used to simplify electrical connections to the electrowetting cell 100

The well 110 is located inside the substrate 180 and is enclosed by the substrate 180 on the sides, the first plate 125 on the top, and the substrate 180 on the bottom. An optional transmissive second plate may be provided on the bottom as shown in FIG. 12, although in this reflective example a second plate is not utilized. The well 110 is a hollow chamber filled with at least two non-mixing media, which can be at least two immiscible fluids, as shown in the example, or at least one fluid and a gas. The non-mixing media are non-mixing materials (e.g., gas or liquid) and, in the example at least two immiscible fluids 111 filled the well 110 and the bottom, top, and sides of the well 110 are enclosed. The at least two immiscible fluids 111 can be chosen depending on the application, for example, two immiscible fluids (one conductive, one non-conductive), that are chemically compatible can be tuned for the desired optical/imaging effects of the electrowetting cell 100. In some examples, three fluids may be used to enable the electrowetting cell 100 to be utilized as a dual lens, where two fluids are non-conductive and the third fluid is conductive and surrounded by the other non-conductive fluids.

The substrate 180 can be any material that allows for layered fabrication and the integration of electrical connections. Although the example of FIG. 1 is a reflective electrowetting cell 100, in the transmissive version, this substrate 180 can be transparent (e.g., glass, plastic, acrylic, etc.) or allow for the integration of some transparent window in the bottom of the well 110 to allow light to pass through. For example, substrate 180 can be formed of glass, ceramic, fiberglass mesh infused with resin (e.g., woven fiberglass/epoxy composites, such as FR4, FR5, etc.), plastic, acrylic, metal, and/or combination thereof. The reflective electrowetting cell 100 of FIG. 1 can be realized if one of the two immiscible fluids 111 is a reflective fluid (liquid metal, nano-particles, etc.) instead of a transparent fluid, or a transparent fluid with a reflective coating onto the substrate 180.

In this example, the first plate 125 is a cover plate that encloses the well 110 on the top, the substrate 180 encloses the well 110 on the bottom, and one or more lateral walls 116A-D enclose the well 110 on the sides. In the example, there are four lateral walls 116A-D shown. It should be understood that the lateral walls 116A-D can be continuous, such that the walls 116A-D collectively form a cone or circle shape. As will be further shown in FIGS. 3A-B in this example the lateral walls 116A-D collectively form a continuous circular perimeter around the well 110. Although the perimeter is shown as circle shaped in FIGS. 3A-B, the perimeter formed by the lateral walls 116A-D can be shaped as an oval; semi-circle; or polygon, such as square, rectangle, pentagon, hexagon, octagon, triangle, or other polygon. The lateral walls 106A-D typically have a surface that is relatively smooth (e.g., one continuous longitudinal surface), but can, in some examples, have a staircase like geometry (e.g., alternating vertical and horizontal surfaces which intersect).

The stepped control channel electrode matrix 105 includes a plurality of stepped control channel electrode arrays 106A-D. In the example, four control channel electrode arrays 106A-D extend from the top of the well 110 just below the first plate 125 where the opening is formed in the seal 130 to the portion of the substrate 180 forming the bottom of the well 110. Each stepped control channel electrode array 106A-D includes a respective plurality of stepped control channel electrodes 115A-F formed at different longitudinal levels along a respective lateral wall 116A-D. In the example, there are six stepped control channel electrodes 115A-F per control channel electrode array 106A-D.

Each stepped control channel electrode 115A-F is independently controllable to control a shape of the at least two immiscible fluids 111 via separately controllable electric fields. When the electrowetting cell 100 is used in a system, for example, that shown in FIGS. 7-10, and 17-19, a control circuit, power supply, switching circuitry, and switches (not shown) may be used to switch the individual stepped electrodes 115A-F on or off independently as will be described in further detail below.

In the example, each stepped control channel electrode 115A-F is used to control the bulk of the at least one of the two immiscible fluids 111 (e.g., instead of microdroplets), to allow for shaping of the at least two immiscible fluids 111. Stepped control channel electrodes 115A-F can be comprised of at least one conductive layer formed of a conductive material, a dielectric material, and the at least one conductive layer is covered by the dielectric material. The conductive material forming the stepped control channel electrodes 115A-F conforms to the desired optical and electrical properties of the electrowetting cell 100. Each stepped control channel electrode 115A-F can be comprised of a conductive coating shaped via laser ablation, photolithography with etching or liftoff or direct photo defining, and layered fabrication (like PCB and ceramics). The dielectric material deposited on the stepped control channel electrodes 115A-F is suitable for the fluids, temperature ranges, and robustness of the entire electrowetting system. In an example, the layer thickness (e.g., layer step height) may determine the thinness of each stepped control channel electrode 115A-F. For example, assuming a layer is 100 microns thick, a first layer can be button wrapped with a stepped electrode, the second layer can be a bare layer, and then the third layer can be button wrapped with another stepped electrode. In an example, this technique can be used to obtain ten equally spaced stepped electrodes (ten steps).

In another example, 30 stepped electrodes can be formed on a vertical wall (6 mm height) with 100 micron layers and a 200 micron pitch between the stepped electrodes.

Laser ablation can enable the stepped electrode size to be thinner than the layer thickness. In other examples, several stepped electrode layers may be combined (e.g., button wrapped) to make a single thicker stepped control channel electrode 115A-F which can simplify the resolution of optical control of the electrowetting cell 100 by obtaining fewer electrodes. For example, four stepped electrodes may be button wrapped together.

As shown, each lateral wall 116A-D encloses the at least two immiscible fluids 111 inside the well 110 from a respective side of the well 110. Each of the plurality of stepped control channel electrode arrays 106A-D is formed vertically along a height of the respective lateral wall 116A-D. The different longitudinal levels of the plurality of stepped control channel electrodes 115A-F of each stepped control channel electrode array 106A-D are positioned at varying vertical distances along the height of the respective lateral wall 116A-D.

In an example, the external contact surface 185A can be located outside of the electrowetting cell 100 on the bottom. Alternatively, external contact surfaces 185B-C can be located on the sides of the substrate 180. In the visible cross-section illustrated in the example, electrowetting cell 100 includes twelve stepped control channel electrode interconnects 118A-L which are conductive media to provide electrical connectivity and extend between the respective stepped control channel electrode pads 120A-L and the respective stepped control channel electrodes 115A-F of stepped control channel electrode arrays 106A-D. Although not completely visible, it should be understood that, in total, there are eight stepped control channel electrode arrays 106A-H and each stepped control channel electrode array 106A-H is formed along a respective lateral wall 116A-H.

Figure 3A:
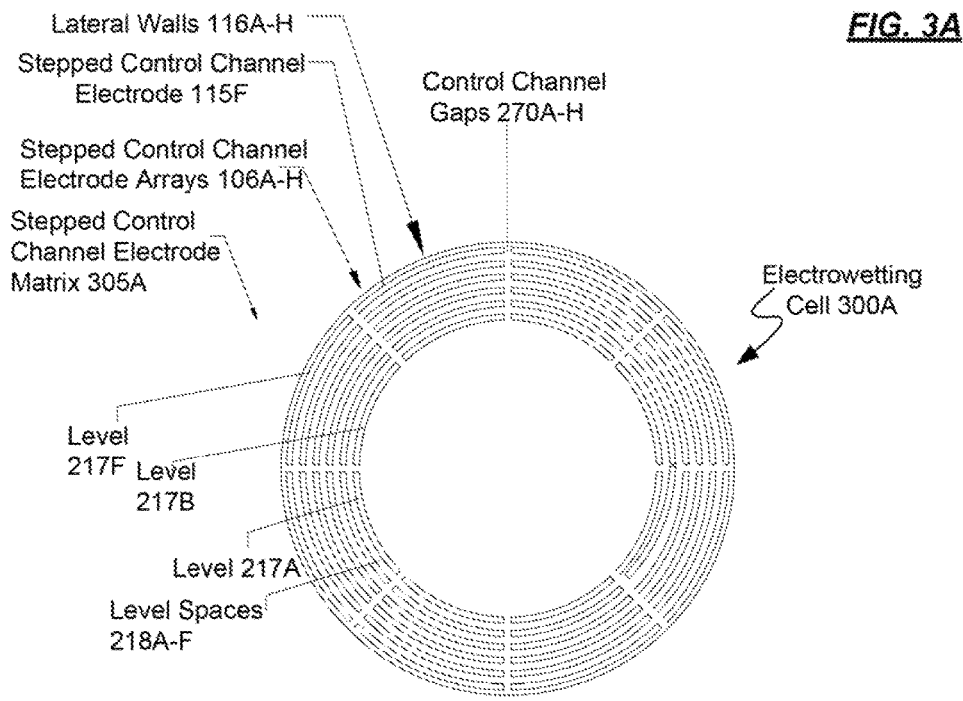
FIG. 3A is a top view of the electrowetting cell construct of FIG. 1 illustrating the segmented layout of the stepped control channel electrode matrix.
Figure 3B:
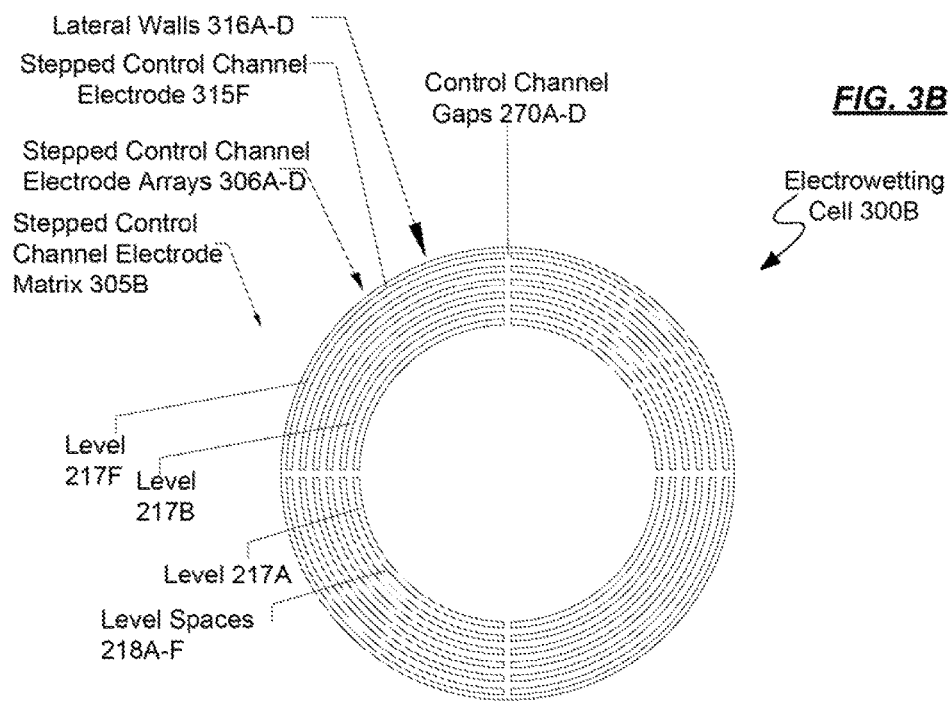
FIG. 3B is a top view of the electrowetting cell construct of FIG. 1 illustrating another segmented layout of the stepped control channel electrode matrix.

Additional respective stepped control channel electrode interconnects are formed for each of the six stepped control channel electrodes 115A-F in each of the eight stepped control channel electrode arrays 106A-H, for a total of 48 interconnects. In the example, the cross-section intersects two full stepped control channel electrode arrays 106B-C and partially intersects stepped control channel electrode arrays 106A and 106D of the control electrode matrix 105. The cross-section also only shows the stepped control channel electrode interconnects coupled to stepped control channel electrode arrays 106A and 106D. Additional stepped control channel electrode arrays 106E-H are not visible, but are formed on the back lateral walls 116E-H of the well 110 as shown in FIG. 3A, hence there are a total of eight lateral walls 116A-H (e.g., one lateral wall 116A-H per stepped control channel electrode array 106A-H). FIG. 3B, described in further detail below, shows an example where there are four total stepped control channel electrode arrays 106A-D and four lateral walls 116A-D.

As shown, each stepped control channel electrode interconnect 118A-F is connected to a respective stepped control channel electrode 115A-F of stepped control channel electrode array 106A on lateral wall 116A. The stepped control channel electrodes 115A-F are connected to respective stepped control channel electrode connection pads 120A-F. The common electrode interconnect 154 is a conductive medium to provide electrical connectivity between the common electrode connection pad 155 and the common electrode 150 and extends between the common electrode 150 and the common electrode connection pad 155. The common electrode interconnect 154 is connected to the common electrode 150 and the common electrode connection pad 155. The common electrode interconnect 154 can be anywhere that allows the common electrode 150 to be in contact (e.g., direct or indirect) with the conductive fluid and can be formed of any suitable conductive material.

In the example of FIG. 1, each of the stepped control channel electrode interconnects 118A-L is a conductive layer deposited on at least one surface of the substrate 180 that leads to a respective stepped control channel electrode connection pad 120A-L to provide electrical connectivity between the respective stepped control channel electrodes 115A-F of the illustrated two stepped channel electrode arrays 106A-B and the respective stepped control channel electrode connection pads 120A-L. The stepped control channel electrodes 115A-F are formed on the side lateral walls 116A-B of the well 110 to control shapes of different portions of the immiscible fluids 111 in the well 110 in response to an applied control voltage. Each of the stepped control channel electrodes 115A-F can be formed of aluminum or other suitable material.

The various electrowetting cell constructs disclosed herein can be manufactured using a variety of techniques, including layering, injection molding, machining, plating, depositing one or more coatings, or a combination thereof. Secondary machining operations, including laser ablation, can be used in combination with all three techniques, for example, to create the shape of the stepped control channel electrodes 115A-F by burning away undesired portions of the coatings. In one example, layered manufacturing builds various vias and embedded metallization of an electrowetting cell in discrete layers. As layers of the substrate 180 are deposited, various internal conductive traces, such as planar electrodes; and vias, such as blind and through vias, are formed. Secondary machining operations may be used to form non-constant planar conductive traces, for example. Surface metallization layers can be deposited as the conductive layers that form the stepped control channel electrode interconnects 118A-L.

Stepped control channel electrode vias can be formed to allow the stepped control channel electrode interconnects 118A-L to connect through substrate 180 instead of through surface traces on the substrate 180. In one example, such constructs may be formed using a layered manufacturing approach. However, the stepped control channel and common electrode interconnects 118A-L and 154 can be one or more conductive layers deposited on at least one surface of the substrate 180 that leads to respective pads to provide electrical connectivity between the respective electrode pads and the electrode. For example, external contact surfaces 185B-C of the substrate 180 are plated with conductive layers, such as surface metallization layers that run or extends partially down the external contact surfaces 185B-C from the common electrode 150 to reach the common electrode connection pad 155.

It should be understood that each of stepped control channel electrodes 115A-F includes a separate stepped control channel electrode interconnect 118A-F as shown in FIG. 1. Moreover, only one side of the electrowetting cell 110 is shown in the cross-section of FIG. 1, which intersects stepped control channel electrode arrays 116A-D and stepped control channel electrode interconnects 118A-L. Although not visible, four additional stepped control channel electrode arrays, twenty-four stepped control channel electrode interconnects, and twenty-four stepped control channel electrode pads are formed in the example electrowetting cell 100.

Although only the common electrode interconnect 154 to the right side of the well 110 is labeled in FIG. 1, multiple common electrode interconnects 154 can be formed that lead to the common electrode connection pad 155. Typically, the common electrode connection pad 155 is formed as a single continuous ring around the external contact surface 185A. However, the common electrode connection pad 155 can be broken up into several pads depending on the design of the electrowetting cell 100.

In this example, an optical active area 160 may be formed through which light is transmitted into the well 110 via the first plate 125, passes through the at least two immiscible fluids 111, and reflects back out of the electrowetting cell 100. The optical axis A corresponds to the direction through which light passes and reflects back through the optical active area 160 of the electrowetting cell 100.

The first plate 125 shown on the top of the electrowetting cell 100 covering the well 110 can be formed of a variety of suitable materials, but the portion of the first plate 125 in the optical active area is also typically formed of clear or transparent glass, plastic, etc.

Generally described, the well 110 is a chamber or vessel that contains fluid(s), gas(es), or both. In the reflective electrowetting cell 100 example, the well 110 is formed of the material of the first plate 125 on the top and the material of the substrate 180 on bottom and side lateral walls 116A-D of the well 110. In the reflective electrowetting cell example of FIG. 12, the second plate is formed of the material of the second plate on the bottom instead of the substrate 180.

The well 110 may be filled with a non-conductive fluid which may be oil and a conductive fluid which may be water, and the fluids are immiscible. The water and oil are controlled by an electric field that is imparted between the common electrode 150 and respective stepped control channel electrodes 115A-F of each stepped control channel electrode array 106A-D that is based on an applied voltage, which are each digitally controlled by being switched on/off. The water (conductive fluid) is driven while the shape of the oil is passively modified based on how the water displaces it. However, other fluids or gases can be used to fill the well 110 and various materials can be used to form the well 110, particularly in areas besides the top (e.g., first plate 125) which is typically formed of transparent materials to allow for light transparency.

In an example, two fluids filling the well typically exhibit a difference in an optical characteristic, e.g. refractive index and/or reflectivity versus transmissivity. The first (non-conductive, e.g. insulating) fluid may be a suitable oil. Suitable fluids for use as the second (conductive) fluid include alcohols, glycols, ionic liquids, or other suitable liquid materials that can conduct electrical or ionic charges adequately to enable the electrowetting operations described herein. Conducting fluids may contain salts or other additives to alter their electrical conductivities, viscosities, surface tensions, or optical characteristics. Specific examples of relatively insulating fluids that may be used include relatively non-conductive 'oil,' liquids such as Dow Corning OS-20, dodecane, and silicone oil. Specific examples of relatively conductive fluids that may be used include aqueous solutions for the more conductive liquid, such as: aqueous mixtures of sodium dodecyl sulfate (SDS), aqueous mixtures of potassium chloride (KCl), and propylene glycol (PG).

In the example, the first non-conductive fluid 111 is at the sealed distal end of the well 110 in the volume of the well 110 that is enclosed by the substrate 180 on the bottom and the sides. The second conductive fluid, fills a remainder of the well 110 at the proximal end of the well 110 in the volume of the well 110 that is enclosed by the first plate 125 on the top and by a seal 130, which is a spacer that holds a sealing gasket in the example (e.g., O-ring combined with a spacer) on the sides. The fluids can be installed in the well 110 before installation of the seal 130 or after. Forming the stepped control channel electrode interconnects 118A-L and common electrode interconnect 154 to lead to the external contact surfaces 185A-C of the electrowetting cell 100 away from sealing surface instead of the top where the cell 100 is being sealed allows for reliable and robust electrical connections to be formed to the stepped control channel electrodes 115A-F and common electrode 150 after the filling process and protects the circuit board from the fluids during assembly. The electrowetting cell constructs may also avoid having an undesired micro layer of fluid on the electrical contacts.

The example electrowetting cell construct 100 generally relates to reflective electrowetting cells. For the reflective cell, a reflector could either be at one end of the well 110. In such a reflective example, the first plate 125 covering the well 110 or a second plate or the substrate 180 forming the bottom of the well 110 can be reflective instead of transparent material, to provide a reflective electrowetting cell for other types of variable optic applications. Another reflective approach involves forming a reflector at the meniscus forming the interface of the two fluids. Alternatively, one of the fluids may be reflective. Teachings herein may also relate to light transmissive electrowetting cells that is to say cells that act as lenses and/or prisms and are relatively transparent with respect to light that passes entirely through the optically active area of a given cell as described in FIG. 12.

Figure 2:
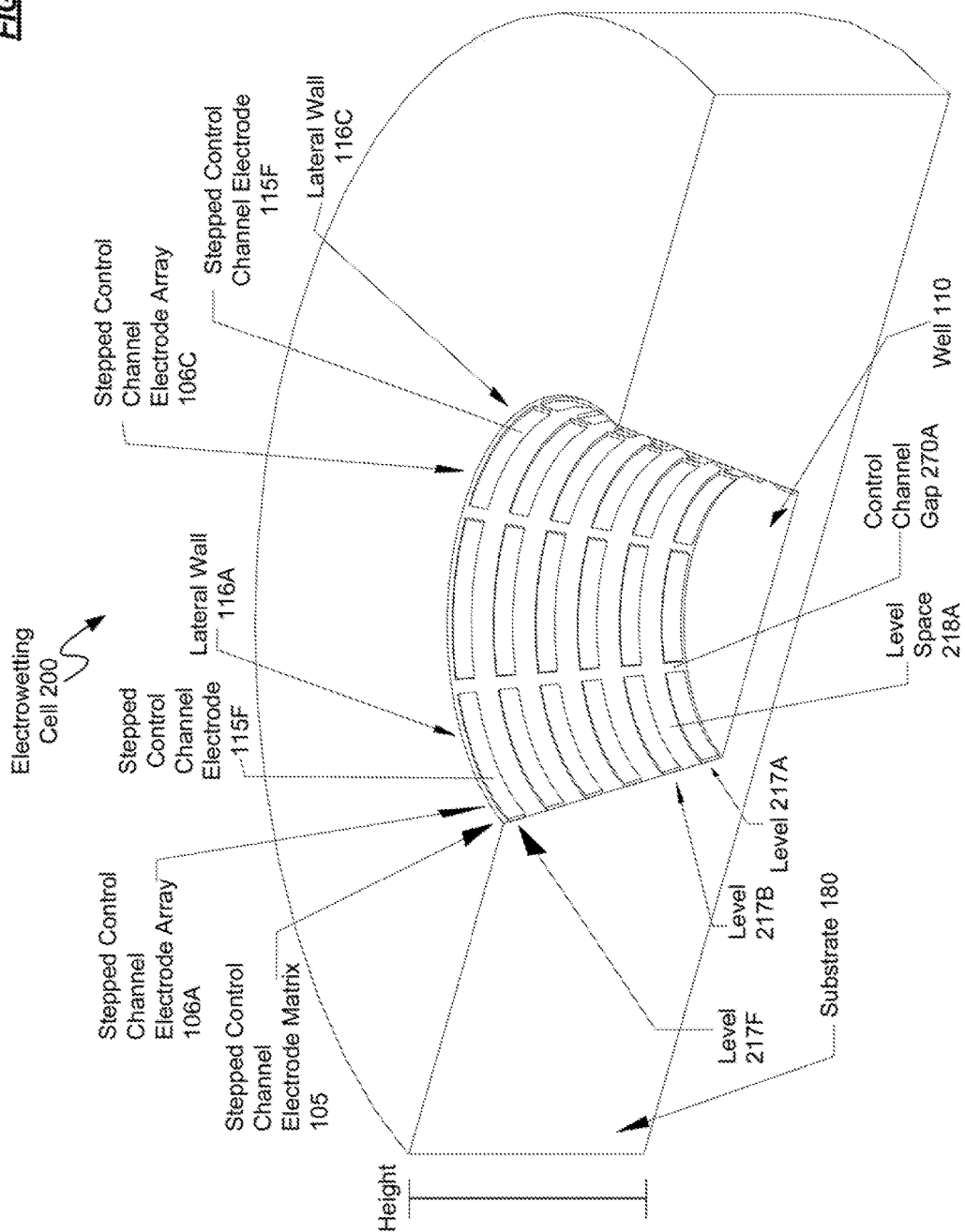
FIG. 2 is an isometric view of the electrowetting cell construct of FIG. 1 showing additional details of a segmented layout of the stepped control channel electrode matrix.

FIG. 2 is an isometric view of the reflective electrowetting cell 200 of FIG. 1 which shows a stepped control channel electrode matrix 105 taken along a cross-section of the well 110. The stepped control channel electrode matrix 105 has a segmented layout and the electrode patterns can be any plurality of radial segmentations or any plurality of vertically segmented electrodes. As shown in the cross-section, a plurality of stepped control channel electrode arrays 106A-D are formed at different longitudinal levels 217A-F along a respective lateral wall 116A-D. In the example, six longitudinal levels 217A-F are depicted along the height (H) of each lateral wall 116A-D.

In the example, six level spaces 218-F are formed horizontally between each of the stepped control channel electrodes 215A-F of the respective stepped control channel electrode array 216A-D. The six level spaces 218-F are formed of an insulator (e.g., substrate 180) that insulates each of the stepped control channel electrodes 115A-F of the respective stepped control channel electrode array 106A-D from each other.

As shown in the example cross-section, four stepped control channel gaps 270A-D are formed between each of the four stepped control channel electrode arrays 106A-D to longitudinally divide the four lateral walls 116A-D of the well 110. The four stepped control channel gaps 270A-D insulate the stepped control channel electrode arrays 106A-D from each other.

FIGS. 3A-B are top views of the electrowetting cell of FIG. 1 illustrating two different segmented layouts of the stepped control channel electrode matrix 105. Electrowetting cells 300A-B each include a respective stepped control channel electrode matrix 305A-B which include varying number of stepped control channel electrode arrays.

In FIG. 3A, the stepped control channel electrode matrix 305A includes eight stepped control channel electrode arrays 106A-H formed across eight respective lateral walls 106A-H. The lateral walls 106A-H include six different longitudinal levels 217A-F. The stepped control channel electrode arrays 106A-H spread across the respective lateral walls 106A-H such that a respective stepped control channel electrode 115A-F and respective level space 218A-F are formed on each longitudinal level 217A-F.

In the example, the level spaces 218A-F are laterally (e.g., horizontally formed) to provide insulation between the stepped control channel electrodes 115A-F. Each of the eight stepped control channel electrode arrays 106A-H span one of eight respective lateral walls 116A-H. The eight stepped control channel electrode arrays 106A-H are divided up longitudinally (e.g., vertically) by eight control channel gaps 270A-H to provide insulation between the stepped control channel electrode arrays 106A-H.

FIG. 3B is similar to FIG. 3A. However, the stepped control channel electrode matrix 305B includes four different stepped control channel electrode arrays 306A-D formed across four respective lateral walls 316A-D. The four stepped control channel electrode arrays 306A-D are divided up longitudinally by four control channel gaps 270A-D to provide insulation between the four stepped control channel electrode arrays 306A-D.

The layouts of the stepped control channel electrode matrices 305A-B can enable complex fluid shapes by enabling a wider range of electrode layouts than having a single vertical control channel electrode. It can be seen that the stepped control channel electrode matrix 305A of FIG. 3A provides more control of the fluid shape than the stepped control channel electrode matrix 305B of FIG. 3B.

Generally, the granularity of the fluid shape control depends on the number of stepped control channel electrode arrays (eight in FIG. 3B vs. four in FIG. 3A), number of stepped control channel electrode in each stepped control channel electrode array (six in both FIGS. 3A-B), spacing between, and size (length and width) of the stepped control channel electrodes. The size of the control channel gaps between the stepped control channel arrays and size of the level spaces between the stepped control channel electrodes also influences the granularity of fluid shape control.

Figure 4:
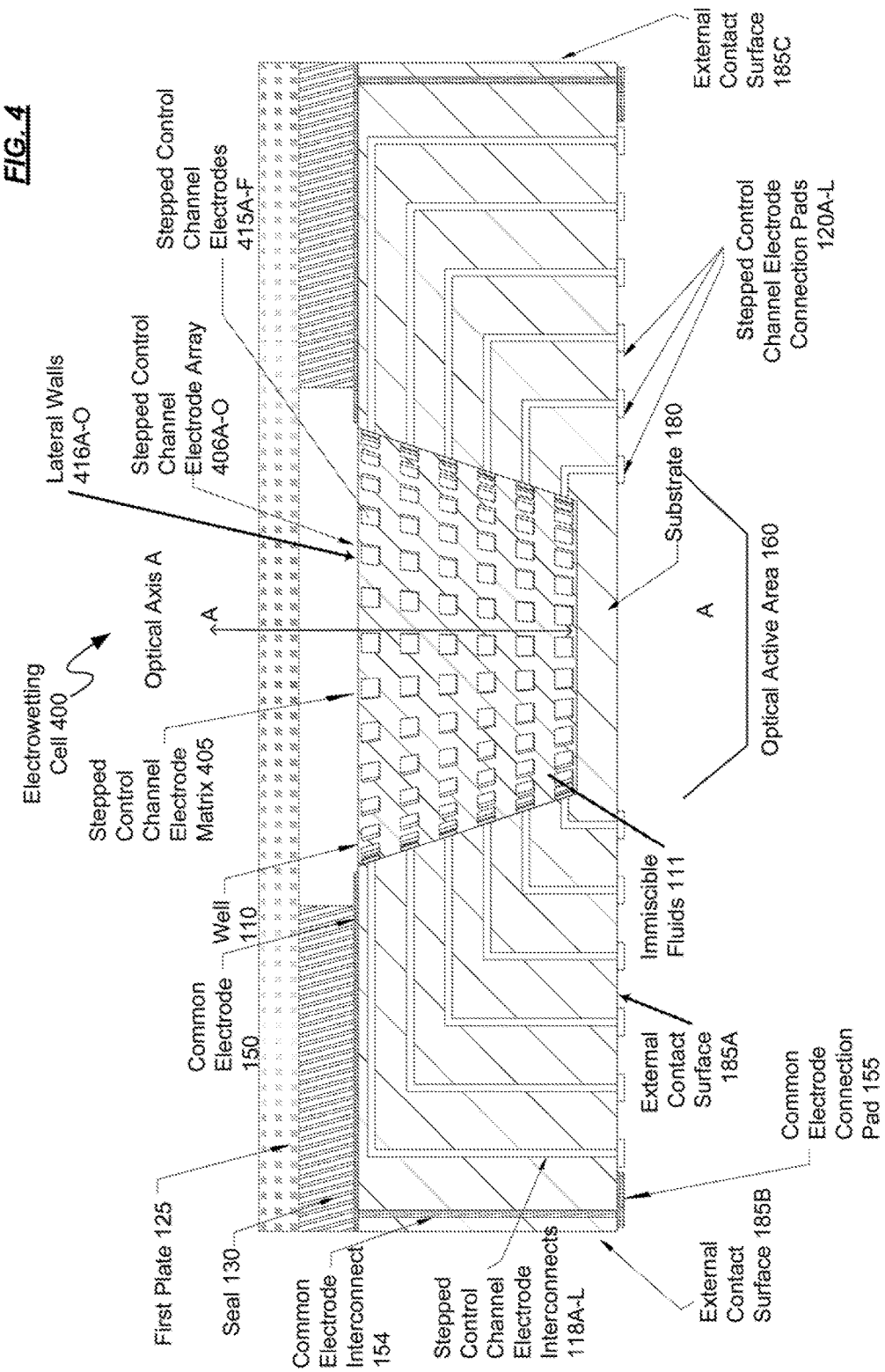
FIG. 4 is a cross-sectional view of an electrowetting cell construct with a grid layout of a stepped control channel electrode matrix.

FIG. 4 is a cross-sectional view of parts of an electrowetting cell 400 with a grid layout of the stepped control channel electrode matrix 405. As shown, the electrowetting cell 400 is a reflective type of cell similar to FIG. 1 and includes a first plate 125 (e.g., cover plate), a substrate 180, a well 110 in the middle of the substrate 180, and a common electrode 150. The electrowetting cell 400 includes a stepped control channel electrode matrix 405 formed on fifteen lateral walls 416A-O of the well 110. This particular grid layout of the stepped control channel electrode matrix 405 is not required, for example, the grid layout can be laid out with different stepped electrode numbers, sizes, shapes, or location as an application requires.

The electrowetting cell 400 includes various interconnects that can lead to external contact surfaces 185A-C that are located outside the well 110 and around at least a portion of one end of the well 110 to provide electrical connection to the electrodes as depicted. The higher density of the stepped control channel electrode matrix 405 has corresponding stepped control channel electrode connection pads 120A-L laid out on external contact surfaces 185A-C of the substrate 180.

The principal difference between FIG. 1 and FIG. 4 is the geometry and variation in the patterning of the stepped control channel electrode matrix 405. The illustrated grid layout of the stepped control channel electrode matrix 405 can enable even more complex fluid shapes than a segmented layout by enabling a wider range of electrode layouts. Due to the increase in the number of stepped control channel electrode arrays 406A-O, in which fifteen are shown in the illustrated cross-section, many more control channel electrode interconnects 118A-L will be needed to connect to the individual stepped control channel electrodes 415A-F. In this example cross-section with fifteen stepped control channel electrode arrays 406A-O and six stepped control channel electrodes 415A-F per array, a total of 90 stepped control channel electrode interconnects will be needed just for the depicted cross-section and a corresponding total of 90 stepped control channel electrode connection pads.

As shown, the stepped control channel electrode interconnects 118A-L extend between the respective stepped control channel electrodes 415A-F and the respective stepped control channel electrode connection pad 120A-L to provide electrical connectivity to the stepped control channel electrode 415A-F through the external contact surface 185A of the electrowetting cell 400. The common electrode connection pad 155 is also shown on the external contact surface 185A. A common electrode interconnect 154 is formed that extends between the common electrode 150 and leads to the common electrode connection pad 155 to provide electrical connectivity between the common electrode 150 and the common electrode connection pad 153 through the external contact surface 185A. Alternatively, the interconnects 155 and 120A-L can be formed in part or in whole as conductive layer deposited on side external contact surfaces 185B-C instead of the bottom external surface 185A of the electrowetting cell 400.

Figure 5:
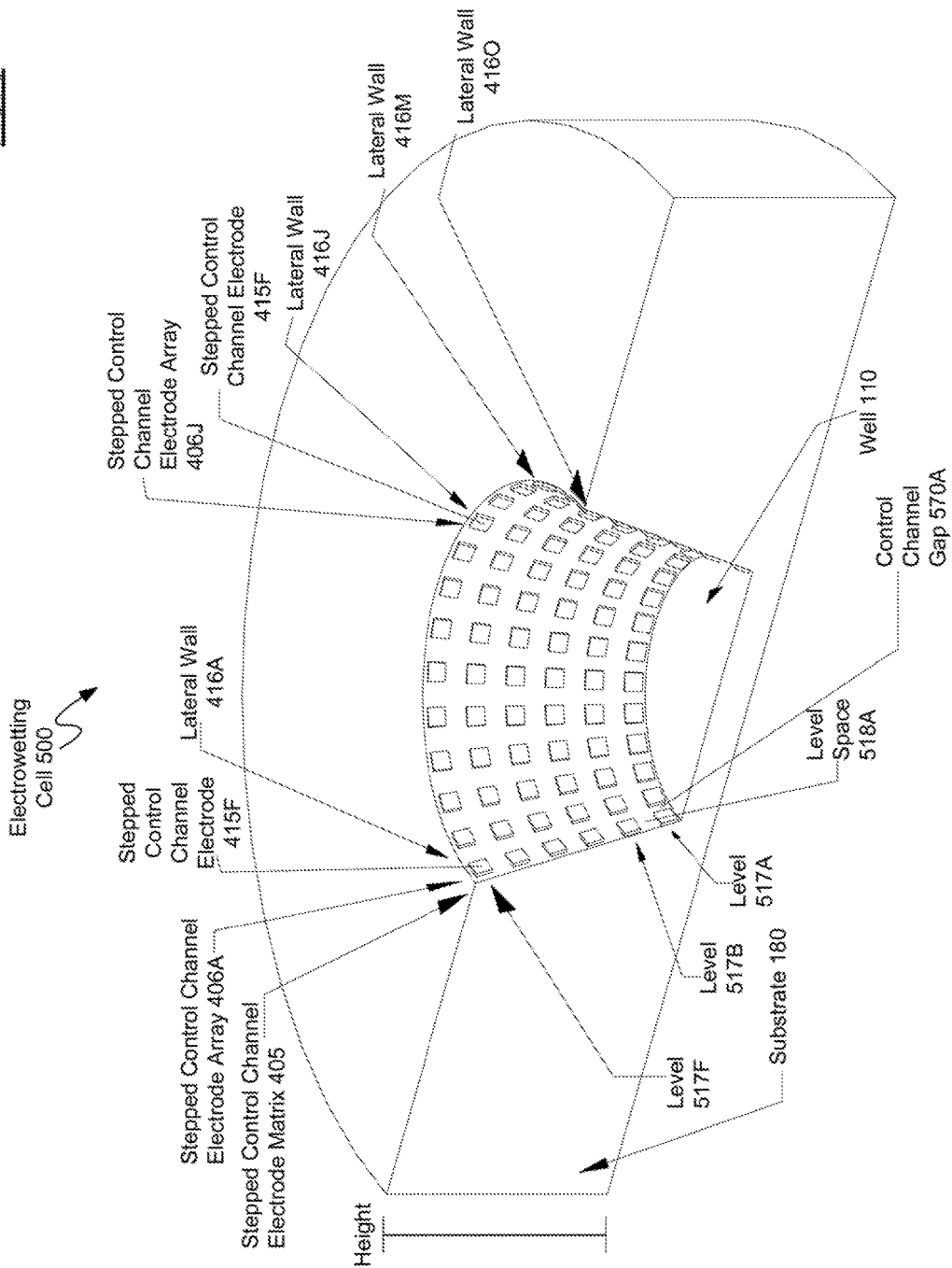
FIG. 5 is an isometric view of the electrowetting cell construct of FIG. 4 showing additional details of the grid layout of the stepped control channel electrode matrix.

FIG. 5 is an isometric view of the electrowetting cell 500 of FIG. 4 showing additional details of the grid layout of the stepped control channel electrode matrix 405. As shown, the stepped control channel electrode matrix 405 includes fifteen stepped control channel electrode arrays 406A-O. The stepped control channel electrode arrays 406A-O span a respective one of the fifteen lateral walls 416A-O. As shown, a respective stepped control channel electrode 415A-F and a respective level space 518A-F is formed at each of the six different longitudinal levels 517A-F on the lateral walls 416A-O.

In the example, different longitudinal levels 517A-F are evenly spaced (e.g., at uniform distances) from each other across the height (H) on the fifteen lateral walls 416A-O, but it should be appreciated that the different longitudinal levels 517A-F can be unevenly spaced apart. Accordingly, the stepped control channel electrodes 415A-F and level spaces 518A-F may be unevenly spaced (e.g., at non-uniform distances) from each other. For example, certain stepped control channel electrodes 415A-F may be more closely or further spaced together in the stepped control channel electrode arrays 406A-O to provide more granular control of the fluid shape in certain areas of the well 110. Similarly, the stepped control channel electrode arrays 406A-O and control channel gaps 570A-O may be unevenly spaced from each other. For example, certain stepped control channel electrode arrays 406A-O may be more closely or further spaced together in the stepped control channel electrode arrays 406A-O.

Figure 6:
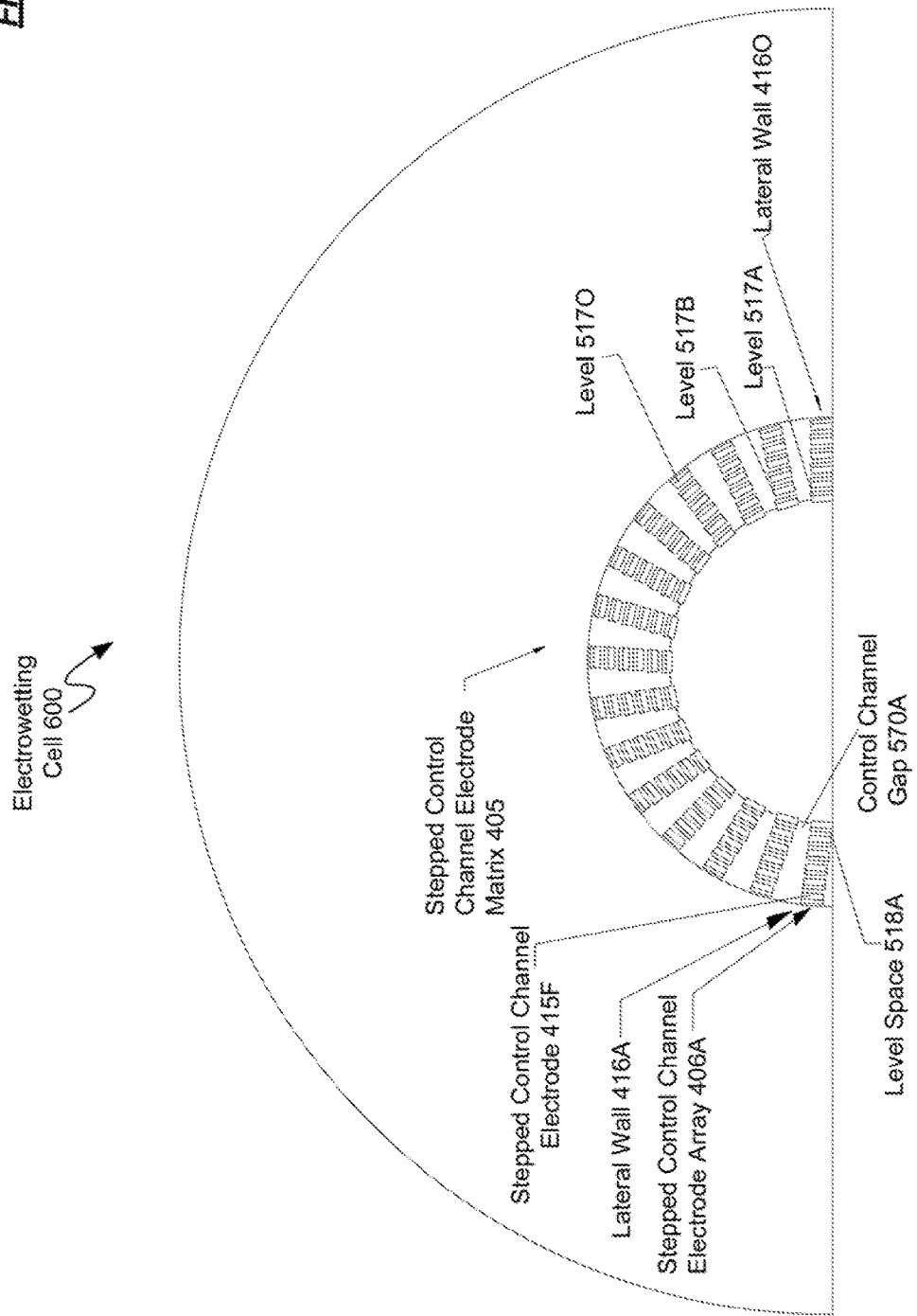
FIG. 6 is a top view of the electrowetting cell construct of FIG. 4 illustrating the grid layout of the stepped control channel electrode matrix.

FIG. 6 is a top view of the electrowetting cell 600 of FIG. 4 illustrating the grid layout of the stepped control channel electrode matrix 405. In the depicted half portion of the electrowetting cell, the stepped control channel electrode matrix 405 has fifteen stepped control channel electrode arrays 406A-O spaced apart by fifteen control channel gaps 570A-O. Stepped control channel electrode arrays 406A-O are located vertically along respective lateral walls 416A-O. In the example, six stepped control channel electrodes 406A-F and six level spaces 518A-F make up the stepped control channel electrode arrays 406A-O.

FIGS. 7-10 illustrate various fluid geometries and electrical connections of an electrowetting system 701. In the examples of FIGS. 7-10, reflective type electrowetting cells are shown; however, in other examples, the cell can be transparent type. The construction of the electrowetting system 701 is identical in FIGS. 7-10, but the principal difference is which of the selected switches 771A-V are turned off or on to drive the stepped control channel electrodes 715A-V to control the shape of one or more fluids 111 in the well 110.

The electrowetting system 701 includes an electrowetting cell 700, which is like the reflective type of electrowetting cell described in FIG. 1. Electrowetting cell 700 includes a stepped control channel electrode matrix 705, which includes a plurality of stepped control channel electrode arrays 706A-B disposed on a respective lateral wall 716A-B. Two stepped control channel electrode arrays 706A-B are visible in the illustration and those arrays 706A-B include eleven stepped control channel electrodes 715A-K and 715L-V, respectively. In the cross-section, eleven control channel electrode interconnects 118A-V are coupled to the eleven respective stepped control channel electrodes 715A-K of the stepped control channel electrode array 706A. Similarly, eleven control channel electrode interconnects 118L-V are coupled to the eleven respective stepped control channel electrodes 715L-V of the stepped control channel electrode array 706B. The twenty-two stepped control channel electrode interconnects 118A-V are coupled to respective stepped control channel electrode connection pads 120A-V.

To electrically control the electrowetting cell 700, electrowetting system 701 includes switching circuitry 790 and a bipolar power supply circuit 792 to provide an applied voltage to stepped control channel electrodes 715A-V. The bipolar power supply circuit 792 can generate an alternating current (AC) voltage such as an AC square wave or binary direct current (DC) voltage. The electrowetting system 701 also includes an array of independently controlled switches 771A-V to open and close the electrical contacts.

In an example, the bipolar power supply circuit 792 generates a single voltage and the switches 771A-V switch stepped control channel electrodes 715A-V on and off to move the first fluid 711 of the at least two immiscible fluids 111 of FIG. 1. Hence, stepped control channel electrodes 715A-V of the stepped control channel electrode arrays 706A-B are independently controlled to selectively switch on or off depending on the desired shape of the first fluid 711. To create the right geometry for the first fluid 711, the stepped control channel electrodes 715A-V turn on and off consecutively to move the first fluid 711 down the lateral walls 706A-B one stepped control channel electrode 715A-V at a time.

Using this circuitry and digital driving approach of the electrowetting system 701, isolation of the stepped control channel electrodes 715A-V of the stepped control channel electrode arrays 706A-B is not needed since all stepped electrodes are driven with the same waveform and amplitude. This allows for lower driving voltages (e.g., a single waveform) from the bipolar power supply circuit 792, which reduces the overall cost of the driving electronics of the electrowetting system 701 compared to systems that use amplitude modulation and capacitive compensation. While some adjustment to the waveform amplitude from the bipolar power supply circuit 792 may be desired in electrowetting system 701, this would primarily only effect the speed of the fluidic actuation of the first fluid 711 of the at least two immiscible fluids 111 of FIG. 1.

In the example, twenty-two switches 771A-V are coupled to the switching circuitry 790. Each switch 771A-V is operated by the switching circuitry 790 and coupled to a respective stepped control channel electrode 715A-V of the stepped control channel electrode arrays 706A-B. Each switch 771A-V is configured to turn on or off based on a respective switching signal (e.g., switching voltage or current) from the switching circuitry 790 that may individually address each switch 771A-V. Based on the respective switching signal, each switch 771A-V is configured to control the applied voltage to the respective stepped control channel electrode 715A-V of the stepped control channel electrode arrays 706A-B. The applied voltage switches between on or off voltage levels (e.g., AC square wave). For example, switches 771A-V can be electronic switching devices, such as solid-state relays or switches which switch on or off when a voltage is applied across a terminal. Such packaged solid-state relays use power semiconductor devices, such as thyristors and transistors, to switch current.

The switches 771A-V are coupled to respective stepped control channel electrode connection pads 120A-V of the assembled electrowetting cell 700 to selectively convey electrical driving voltages (e.g., binary DC or AC voltage) from the bipolar power supply 792 to the stepped control channel electrodes 715A-V based on selection (e.g., on or off activation) of the input of the switch 771A-V by the switching circuitry 790. When the switches 771A-V are turned off or on by the coupled switching circuitry 790, the coupled stepped control channel electrodes 715A-V are also driven off or on by the bipolar power supply 792. The conveyed electrical driving voltages are routed via the stepped control channel electrode interconnects 118A-V to the stepped control channel electrodes 115A-V.

In an example, the switching circuitry 790 includes a control circuit which can include solid-state circuitry (e.g., switch banks) coupled to solid-state type switches 771A-V. While such solid-state type switches 771A-V and switching circuitry 790 may be relatively inexpensive, the cost depends on drive voltages which can be tunable depending on the dielectric of the electrowetting cell 700.

Switching circuitry 790 can include row and column drivers (e.g., source and gate drivers) with control lines and transistors in which a single voltage is applied and the timing of how long each stepped control channel electrode 715A-V is controlled by a timing controller. Such drivers and timing controllers are found in liquid crystal displays (LCD).

Switching circuitry 790 can include various light emitting diode (LED) light sources and an LED driver. A respective LED of the switching circuitry 790 is coupled to a respective input of switches 771A-V. When a current passes through the respective LED light source, the output light is focused on an input of the respective switches 771A-V, such as an adjacent photo sensitive transistor, darlington pair or triac to activate the switches 771A-V on or off.

The switching circuitry 790 can include a digital-to-analog converter that converts a digital input from a processor to an analog switching signal that turns off or on the switches 771A-V via the LED driver. When selected 771A-V switches are on, the voltage from the bipolar power supply circuit 792 is applied to the selected stepped control channel electrode 715A-V. When the selected switches 771A-V are off, the voltage is not applied to the selected stepped control channel electrode 715A-V.

The switching circuitry 790 can include a processor (e.g., microprocessor or microcontroller), a memory coupled to the switches 771A-V to digitally control the respective stepped control channel electrode, and a digital-to-analog converter. The digital-to-analog converter can be coupled to an output of the processor and configured to generate a switching signal in response to being digitally controlled by the processor output.

One or more of the switching circuitry 790, bipolar power supply 792, and/or switches 771A-V may be disposed a circuit board, such as a rigid or flexible printed circuit board (PCB) that is coupled to one or more of the external contact surfaces 185A-C of the electrowetting cell 700. In an example, the flexible PCB has a flexible PCB tail connector.

The circuit board can have circuit connections in electrical contact with each respective stepped control channel electrode connection pad 120A-V and the common electrode connection pad 155 to turn off and on the circuit lines leading to the stepped control channel electrodes 115A-V to control the supply of an applied voltage to each respective stepped control channel electrode 115A-V. The digital-to-analog converter of the switching circuitry 790 generates a respective switching signal based on digital controls from the processor. The switches 771A-V receive the respective switching signal and convey the applied voltage from the bipolar power supply 792 based on the respective switching signal to the stepped control channel electrode connection pads 120A-V. In some examples, the processor and memory of the switching circuitry 790 may be disposed on a different circuit board than the digital-to-analog converter and driver of the switching circuitry 790; and switches 771A-V, for example.

With the disclosed on and off control of the electrowetting cell 700, lower driving voltages can be achieved by the electrowetting system 701. Accordingly, the electrowetting system 701 may be classified as a class 2 device instead of class 1 device for UL™ an CE™ certification purposes. Advantageously, class 2 devices are easier to qualify with UL™ and CE™ than class 1 devices which require electrical isolation instead of just insulation.

Figure 7:
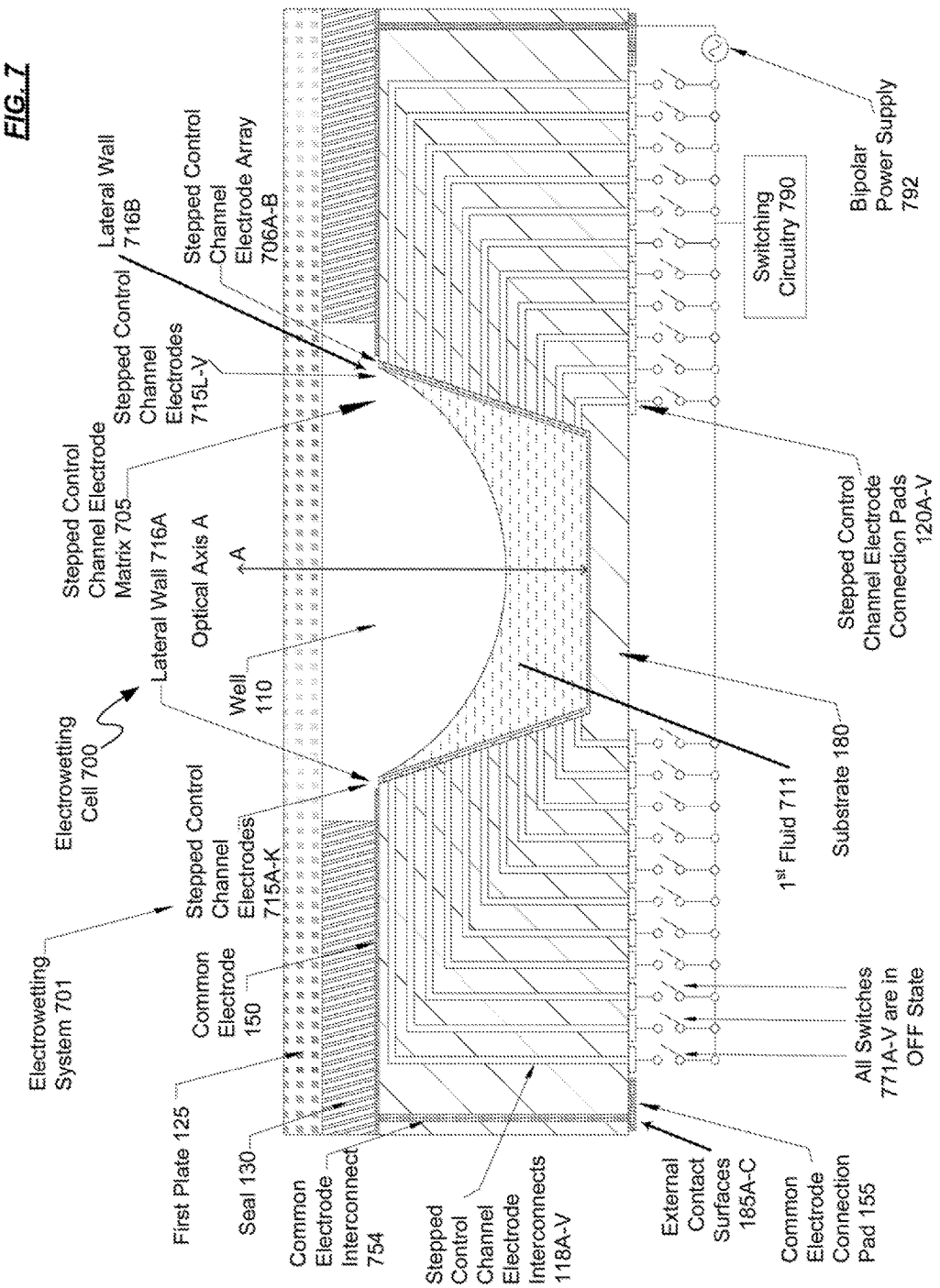
FIGS. 7-10 illustrate various fluid geometries and electrical connections of an electrowetting system that includes an electrowetting cell, switching circuitry, and switches coupled to stepped control channel electrode connection pads of an assembled electrowetting cell construct with various stepped control channel electrodes being driven on or off.
Figure 8:
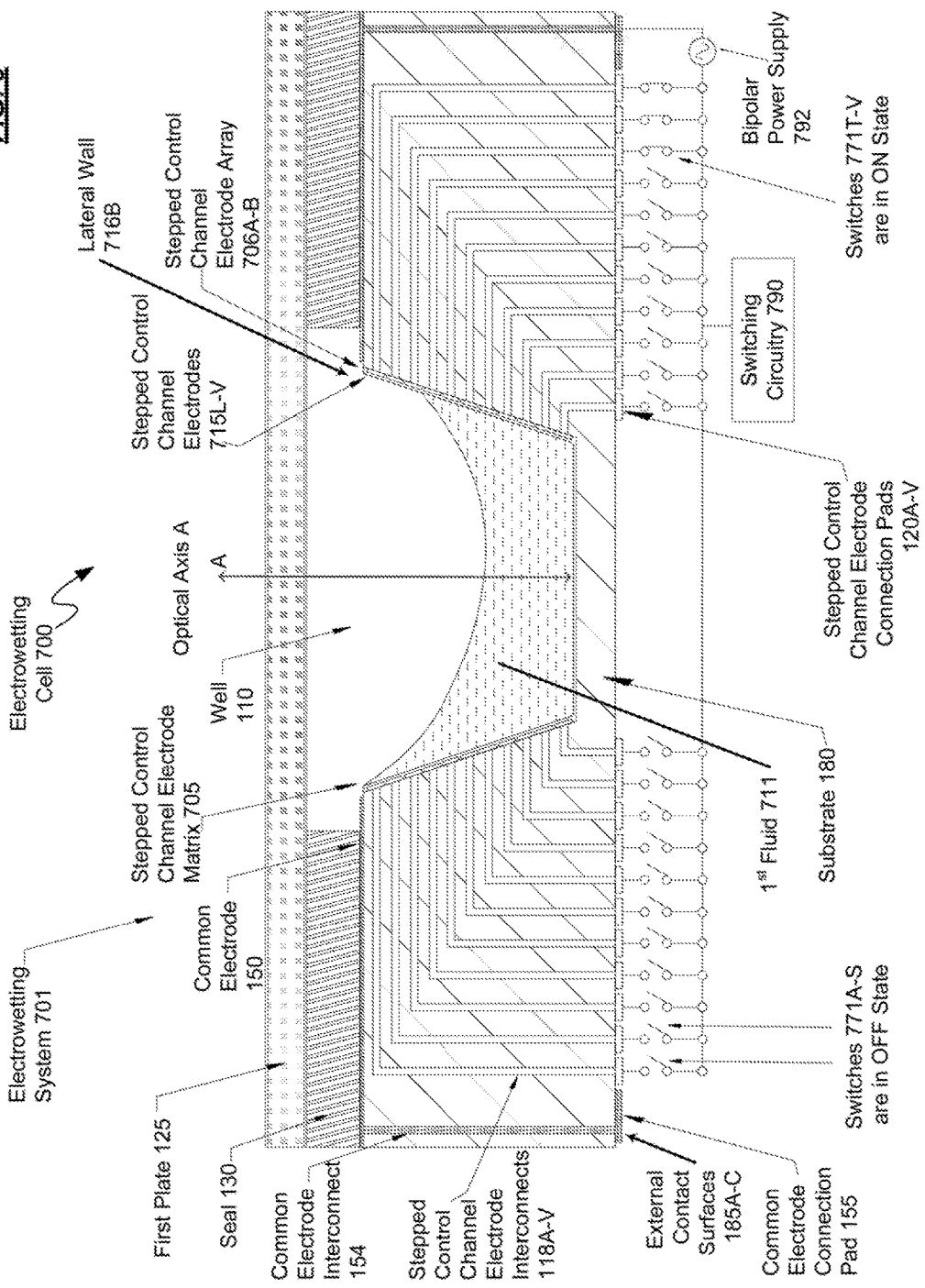
Figure 9:
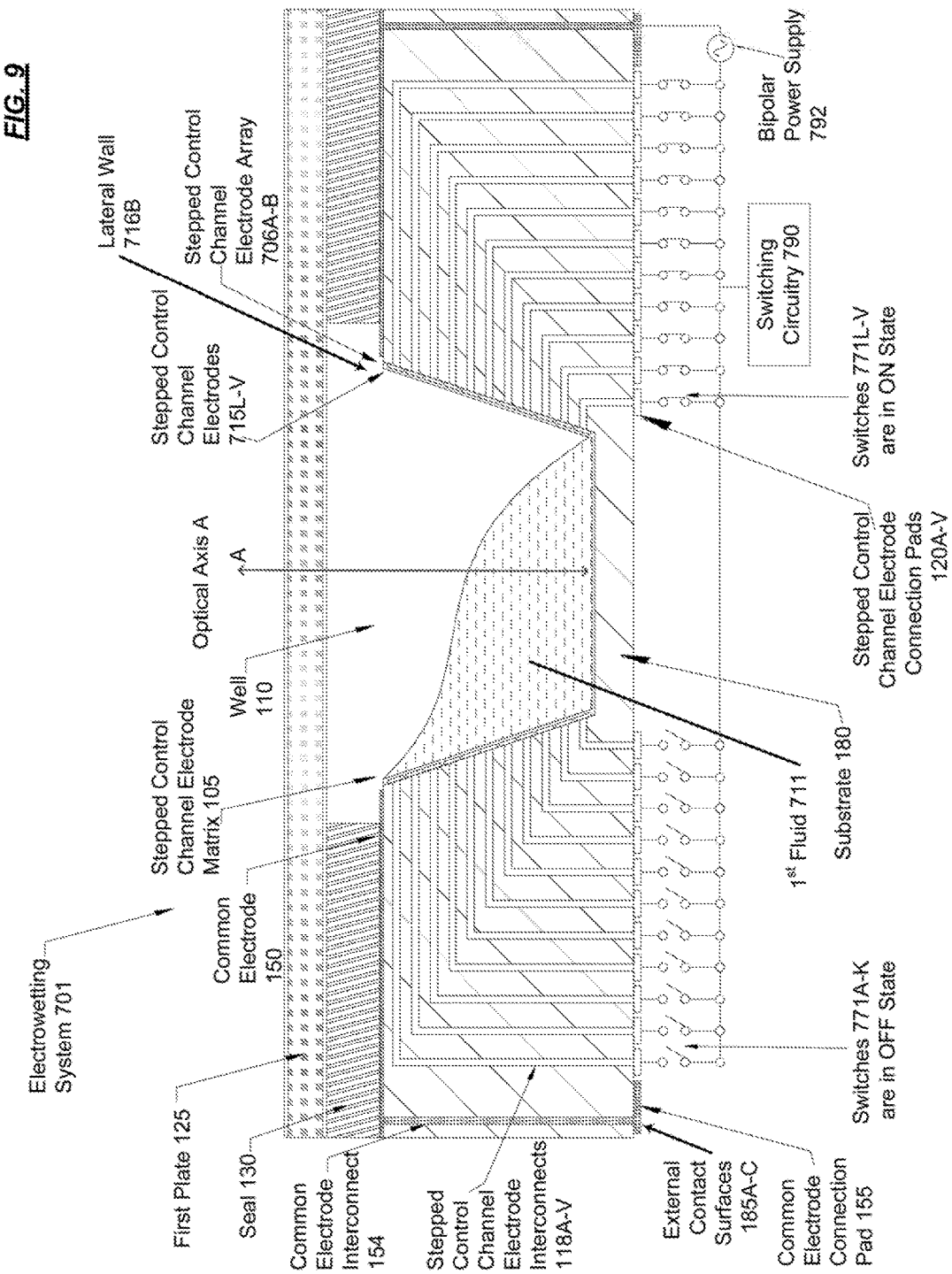
Figure 10:
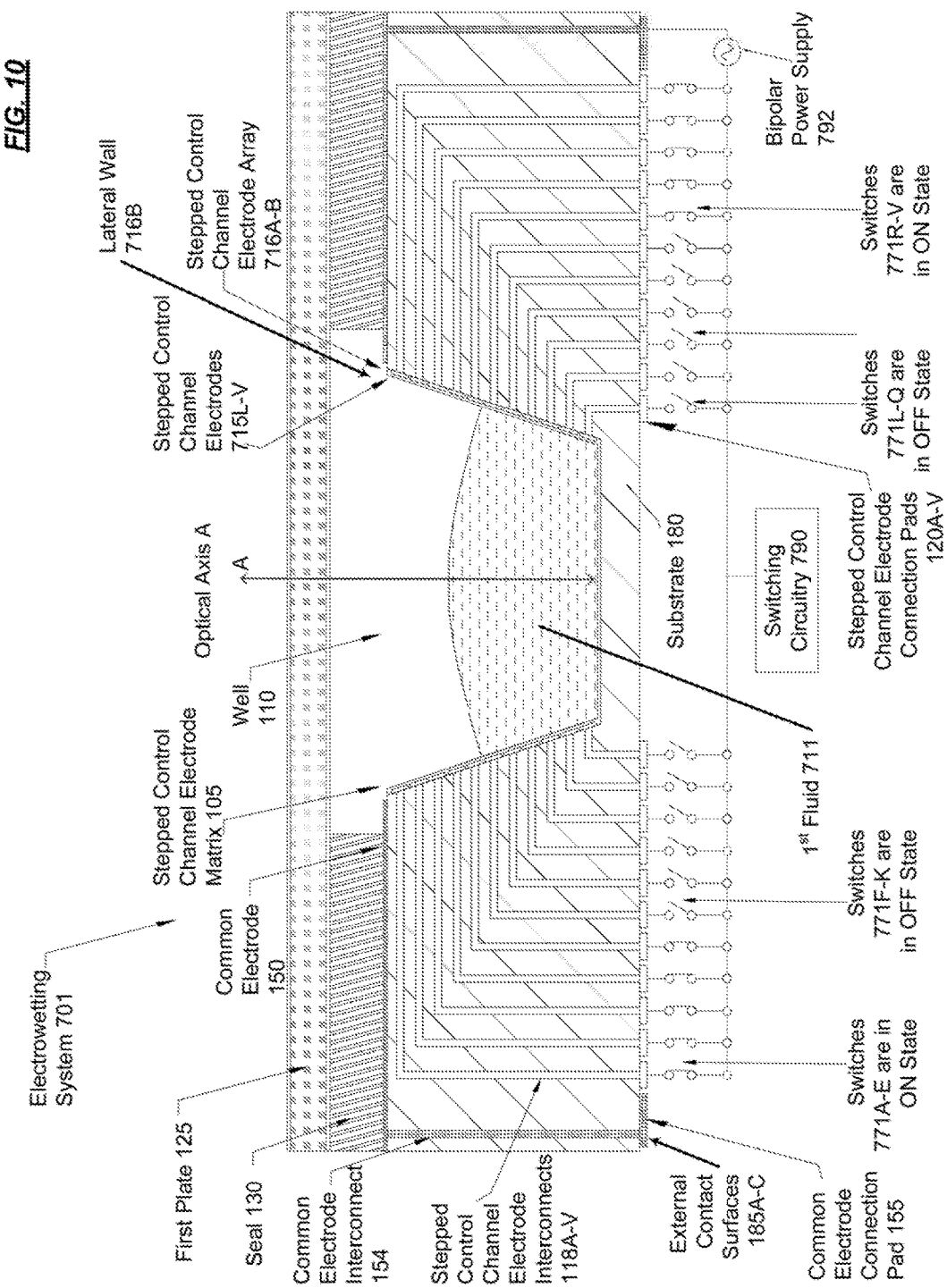

As shown in FIG. 7, switches 771A-V are all in the off state; therefore, stepped control channel electrodes 715A-V are all off and a first fluid 711 of the at least two immiscible fluids 111 of FIG. 1 has a symmetrical shape where equal portions of the lateral walls 716A-B of the well 110 are wetted. In FIG. 8, switches 771A-S are in the off state and switches 771T-V are in the on state. Accordingly, stepped control channel electrodes 715A-S are in the off state and stepped control channel electrodes 715T-V are in the on state. Hence the first fluid 711 has an asymmetrical shape where unequal portions of the lateral walls 716A-B of the well 110 are wetted, particularly the upper right lateral wall 716B where stepped control channel electrodes 715T-V are located is not wetted by the first fluid 711 of the two immiscible fluids 111 of FIG. 1. As depicted in FIG. 9, switches 771A-K are in the off state and switches 771L-V are in the on state. Hence, the first fluid 711 has an asymmetrical shape where the entire right lateral wall 716B of the well 110 in which stepped control channel electrodes 715L-V are located is not wetted by the first fluid 711. In FIG. 10, switches 771A-E are in the on state, switches 771F-Q are in the off state, and switches 771R-V are in the on state, hence the first fluid 711 has a symmetrical shape where equal portions of the lateral walls 716A-B of the well 110 are wetted.

Switching circuitry 790, bipolar power supply 792, and/or switches 771A-V, and the stepped control channel electrodes 715A-V control the displacement of the first fluid 711 on the lateral walls 716A-B, which is influenced by the contact angle between the fluids in the well 110, geometry, applied voltage, and dielectric. When a voltage is applied, the contact angle between the fluid(s) in the well 110 can change which moves fluid 711 up or down lateral walls 716A-B FIG. 11A is a top perspective view of an electrowetting cell 1100 with a segmented layout of the stepped control channel electrode matrix 1105 formed on lateral walls 1116A-C. Control channel gaps 1170A-B are formed between each of the stepped control channel electrode arrays 1106A-C. As further shown, a plurality of level spaces 1118A-N are formed horizontally between each of the stepped control channel electrodes 1115A-N. A common electrode 150 is formed on the top of the substrate 180.

FIG. 11B is a bottom perspective view of the electrowetting cell 1100 of FIG. 11A. Forty-eight total connection pads are formed on the external contact surface 185A, including a common electrode connection pad 155 and various stepped control channel electrode connection pads 120A-C.

FIG. 12 is a cross-sectional view of parts of an assembled transparent electrowetting cell 1200. The electrowetting cell 1200 construct is similar to that of the reflective type of FIG. 1, including the stepped control channel electrode matrix 105. However, when the electrowetting cell 1200 is a transparent type, a second plate 1226 is formed on the bottom of the electrowetting cell 1200 to enclose the well 110 in the optical active area 1260 instead of the substrate 180. The second plate 1226 can be a transparent window that can be formed of clear or transparent (e.g., highly light transmissive) glass, plastic (e.g., acrylic), etc.

In an example, the substrate 180 includes the second plate 1226 in the optically active area 1260 supporting the well 110, but also includes material forming the substrate 180 in lateral regions outside of the well 110. For example, the second plate 1226 can be attached via glass frit bonding, which uses localized heat to melt an intermediate layer of frit glass to seal the second plate 1226 and the substrate 180 together. As another example, the second plate 1226 is adhered to the substrate 180 with suitable adhesive.

FIG. 13A is a top view of the electrowetting cell construct 1300A of FIG. 12 illustrating a segmented layout of the stepped control channel electrode matrix 305A. The segmented layout of the stepped control channel electrode matrix 305A of electrowetting cell 1300A is identical to that of FIG. 3A, but also depicts the second plate 1226 of the transmissive type electrowetting cell 1300A of FIG. 12 at the bottom of the well.

FIG. 13B is a top view of the electrowetting cell construct of FIG. 12 illustrating another segmented layout of the stepped control channel electrode matrix 305B. The segmented layout of the stepped control channel electrode matrix 305B is identical to that of FIG. 3B, but also depicts the second plate 1226 of the transmissive type electrowetting cell 1300B of FIG. 12 at the bottom of the well.

Figure 14:
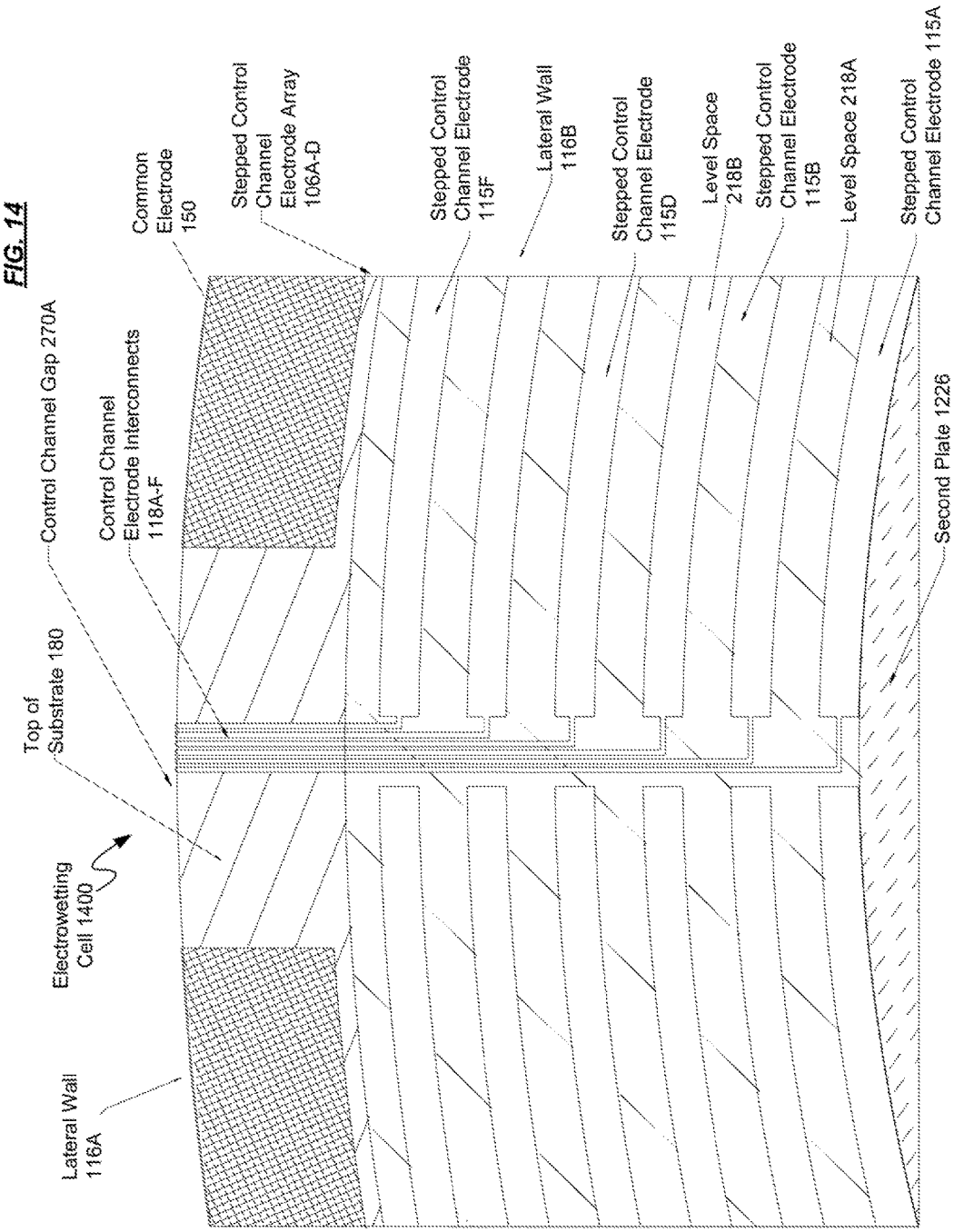
FIG. 14 is a zoomed in view of an electrowetting cell construct and shows details of example routed traces for interconnects to stepped control channel electrodes.
Figure 15:
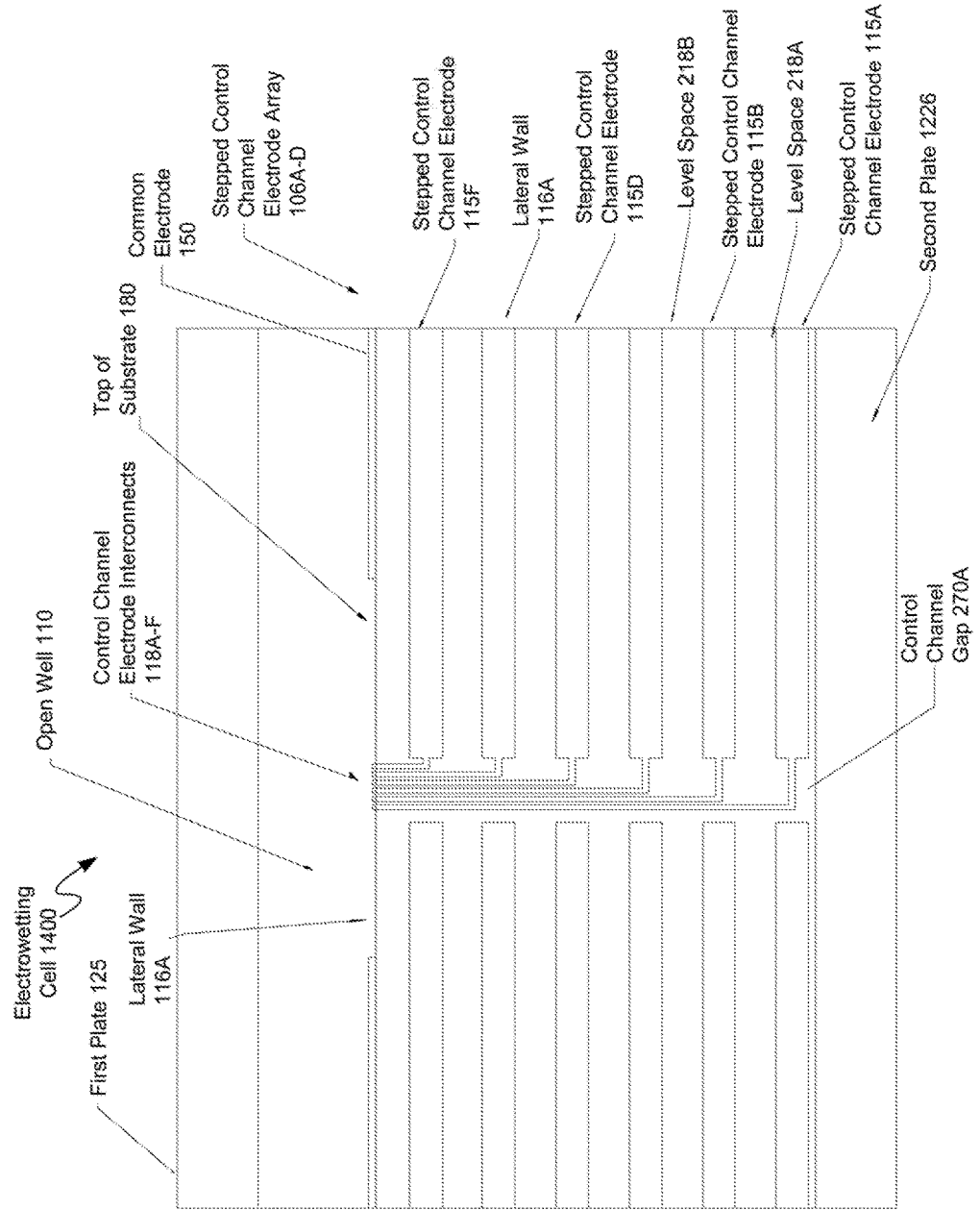
FIG. 15 is a zoomed out view of the electrowetting cell construct of FIG. 14 to show additional context for the example routed traces for interconnects.

FIG. 14 is a zoomed in view of an example transparent electrowetting cell 1400 with a transparent second plate 1226 on the bottom and a substrate 180. FIG. 15 is similar to FIG. 14, but is a zoomed out view of the example transparent electrowetting cell 1400. As shown, the stepped control channel electrode interconnects 118A-F are formed as routed traces along the top of the substrate 180. In the cross-section, the stepped control channel electrode interconnects 118A-F are shown as being formed as extending down the substrate 180 along the control channel gap 270A between an opening at ends of the common electrode 150. The control channel electrode interconnects 118-F contact respective stepped control channel electrodes 115A-F to achieve electrical connection.

The stepped control channel electrode interconnect 118A-F may include at least one respective stepped control channel electrode via formed in the substrate 180 that extends between a respective stepped control channel electrode connection pad (not shown) and a respective stepped control channel electrode 115A-F.

The stepped control channel electrode interconnect 118A-F can include one or more conductive traces, such as a planar electrode, that extends to and intersects one or more vias, such as a blind via, that leads to a respective stepped control channel electrode connection pad (not shown). A via is the resulting passage (e.g., hole) through the substrate 180 formed by the hole and also includes the metallization, pin, or other conductive medium/material that is within and fills the passage. In other words, a via includes the passage and the conductive material that fills the passage to provide electrical connectivity. Planar electrodes are formed parallel to the substrate 180 and blind vias are formed perpendicular (e.g., vertical) to the substrate 180. Planar electrodes and blind vias forming the stepped control channel electrode interconnects 118A-L provide electrical connectivity between the stepped control channel electrode 115A-F and the stepped control channel electrode connection pad 120A-L. As an alternative to the planar electrodes and blind vias, a through hole via can be formed between the stepped control channel electrodes 115A-F and the stepped control channel electrode connection pad 120A-L. (e.g., formed at least substantially parallel to an optical axis A). It should be understood that vias, such as through hole vias and blind vias, may be non-linear or formed at angles other than 90° with respect to the substrate 180, including 70°, 80°, etc.

In the example, the stepped control channel electrode interconnect 118A includes a small internal conductive trace, shown as planar electrode, and a much larger interconnected blind via that are oriented in different directions but that intersect. The planar electrode and the blind via can be variable in size (e.g., length, width, thickness, etc.). A respective stepped control channel electrode interconnect 118B-F is formed that extends between each of the remaining stepped control channel electrodes 115B-F and respective stepped control channel electrode connection pads (not shown).

A horizontally formed conductive trace, such as the planar electrode can be formed by, for example, layering of the substrate 180. For example, by plating that plane of the substrate 180 with metal, etc. before stacking more layers of substrate 180 on top of it. Via constructs can be formed by machining before the plating steps.

Figure 16:
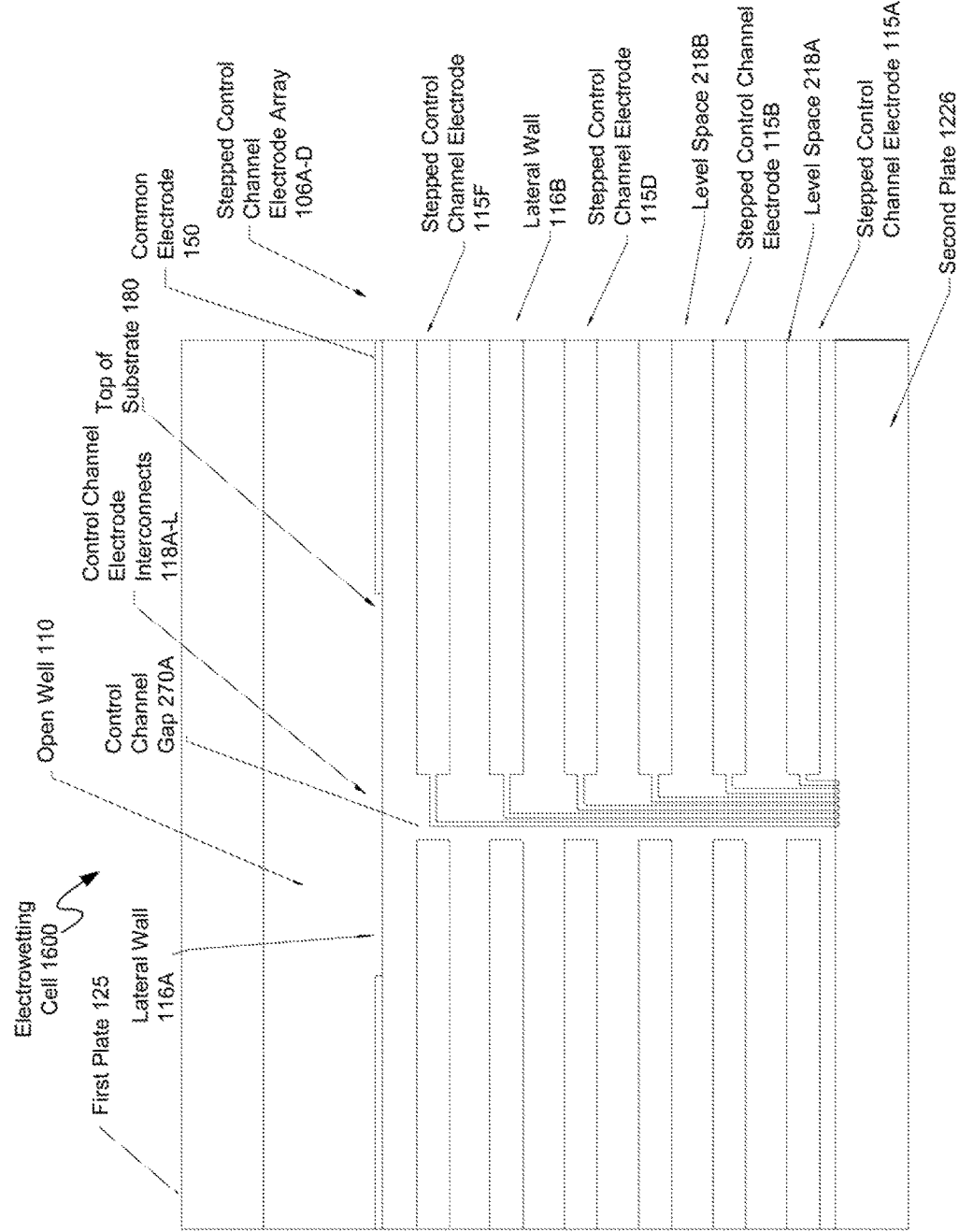
FIG. 16 is a zoomed in view of another electrowetting cell construct and shows different routed traces for interconnects to stepped control channel electrodes.

FIG. 16 is a zoomed in view of another example transparent electrowetting cell 1600. The example electrowetting cell 1600 is very similar to that of FIGS. 14-15, but the stepped control channel electrode interconnects 118A-F are routed along the bottom of the substrate 180 and extend upwards from the bottom of the electrowetting 1600 where second plate 1226 is located.

Figure 17:
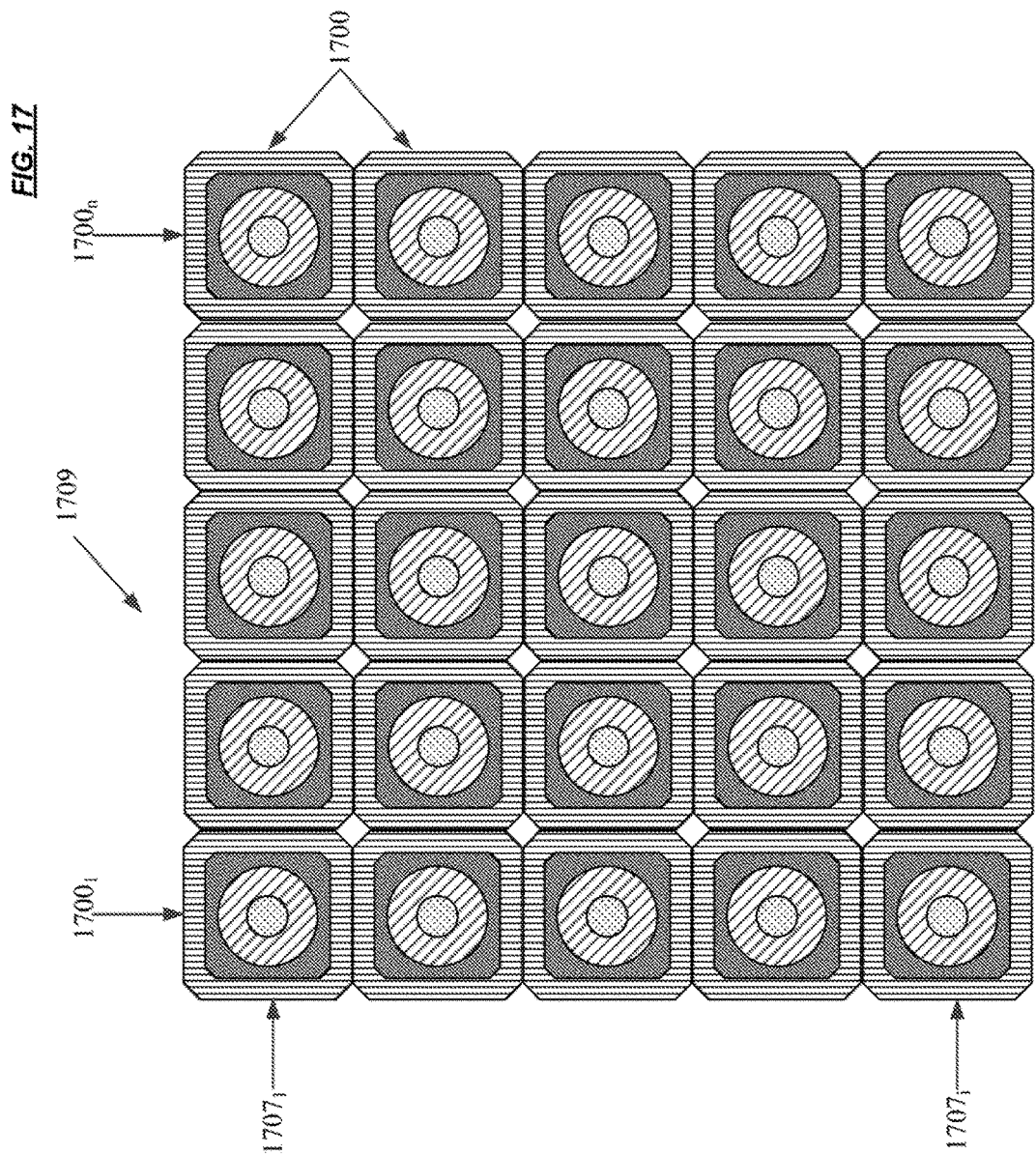
FIG. 17 depicts an assembly of electrowetting cells forming a row-and-column matrix for an array of electrowetting cells.

FIG. 17 depicts an assembly of a number of rows $1707_1$ to $1707_i$ of electrowetting cells 1700 to form an array 1709. Each of the i rows $1707_1$ to $1707_i$ includes a number n of cells $1700_1$ to $1700_n$. In this manner, the cells form an i×n row-and-column matrix for the array 1709 of electrowetting cells 1700. Although not shown, suitable leads would connect to the flexible PCB tails of the various cells 1700 to $1700n$ of the rows $1707_1$ to $1707_i$ forming the array 1709. For example, the leads may form a bus system connecting all of the cells of the array in common, e.g. to a single driver circuit and associated controller. In such an electrical arrangement all of the i×n electrowetting cells 1700 would be controlled in common. Various other connection arrangements may be used, e.g. to control each cell independently with connections to a separate driver for each cell of the matrix, to control each row independently with connection of each row to a separate driver, or to control various sub-matrices of the array independent of each other (but with all of the cells in a given sub-matrix connected together and commonly controlled) with a separate driver connected to each sub-matrix.

In the example, the driver is separate from the cell(s) driven by the respective driver. Alternatively, the driver(s) may be more closely associated with respective cell(s). For example, some or all of the driver circuitry for a particular cell might be implemented on the flexible circuit board of the cell.

Figure 18:
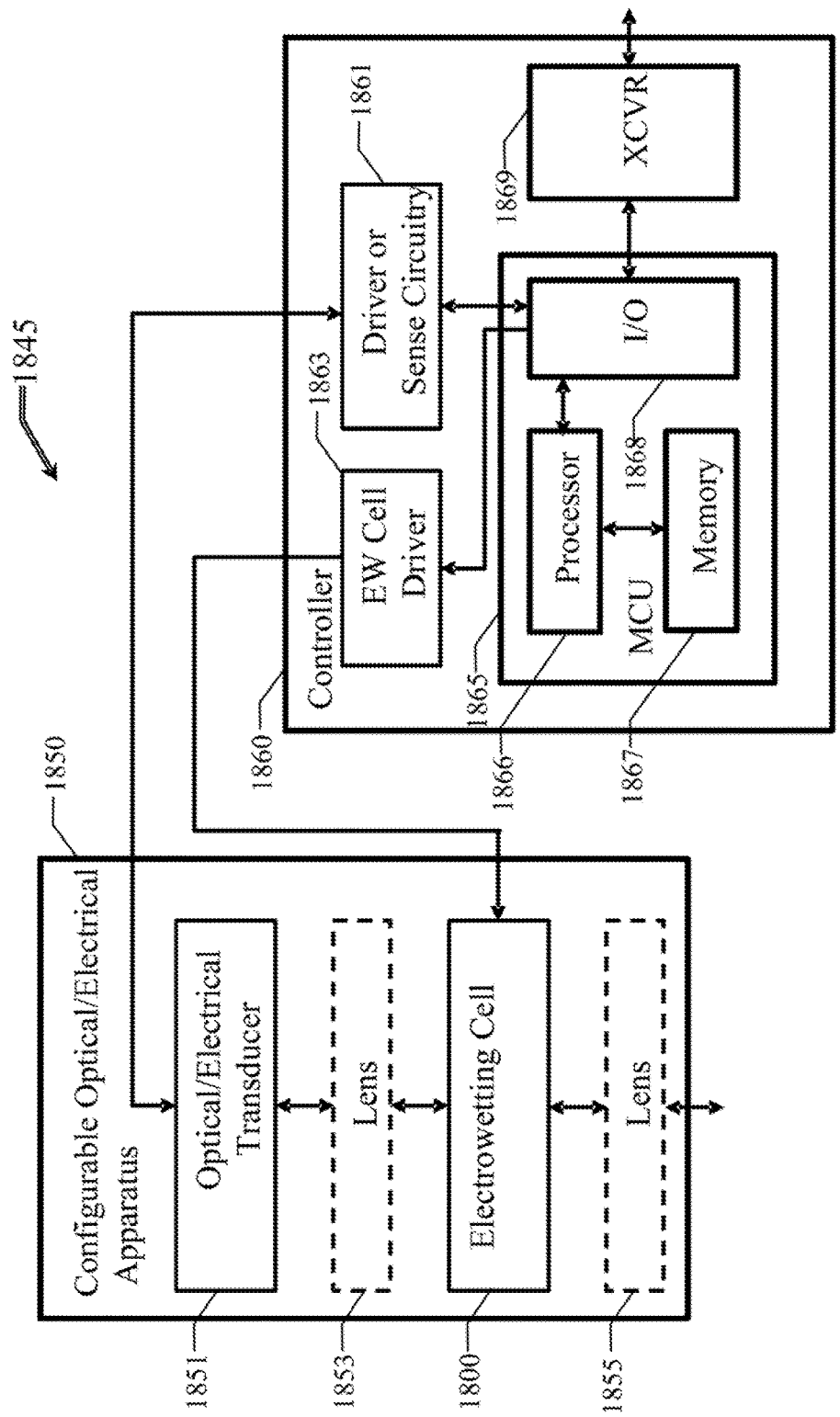
FIG. 18 is a simplified functional block diagram of a system combining an electrowetting cell like that described with an optical/electrical transducer and associated circuitry.

FIG. 18 is a simplified functional block diagram of a system 1845, which includes a configurable optical/electrical apparatus 1850 and a controller 1860. The configurable optical/electrical apparatus 1850 combines an electrowetting cell like that described above with an optical/electrical transducer 1851. Although associated circuitry may be provided in the apparatus 1850, the example shows circuitry in the controller 1860, which may be somewhat separate from or even remote from the configurable optical/electrical apparatus 850.

An optical/electrical transducer 1851 is a device that converts between forms of optical and electrical energy, for example, from optical energy to an electrical signal or from electrical energy to an optical output. Examples of optical-to-electrical transducers include various sensors or detectors, photovoltaic devices and the like. Optical-to-electrical transducers discussed herein are responsive to light, and the light may be visible light, ultraviolet light, infrared, near infrared or light in other portions of the optical spectrum.

Examples of electrical-to-optical transducers include various light emitters, although the emitted light may be in the visible spectrum or in other wavelength ranges. Suitable light generation sources for use as the transducer 1851 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the transducer 1851. For example, it should be understood that non-micro versions of the foregoing light generation sources can be used.

When optical transducer 1851 is a light source, the light source may use a single emitter to generate light or may combine light from some number of emitters that generate the light. A lamp or 'light bulb' is an example of a single source. An LED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer 1851 may or may not be pixelated for control purposes. The electrowetting cell 1800 is controlled to selectively optically change or spatially (optically) modulate the light distribution output from the transducer and thus from the apparatus 1850. The electrowetting cell 1800 may support controlled beam steering, controlled beam shaping or a combination of controlled beam steering and shaping.

In another example, optical transducer 1851 is an optical-to-electrical converter, that is to say, a light sensor or detector or a photovoltaic device. The overall apparatus 1850 in such a case may be configured as an imager, other light responsive sensor, light responsive power source, or the like. The light detector may be an array of light detectors, a photo-detector such as a photodiode, or a photovoltaic device, depending on the desired function of optical/electrical apparatus 1850. Other suitable light detectors for use as optical/electrical transducer 1851 include charge-coupled device (CCD) arrays, complementary metal-oxide-semiconductor (CMOS) arrays, photomultipliers, image intensifiers, phototransistors, photo resistors, thermal imagers, and micro-electromechanical systems (MEMS) imagers. Nonetheless, virtually any detector of light may be used as the transducer 1851 in an optical-to-electrical arrangement of apparatus 1860. Suitable light detectors will be known to one of ordinary skill in the art from the description herein. The electrowetting cell 1800 is controlled to selectively optically change or spatially (optically) modulate the field of view of light coming into the apparatus 1850 for delivery to transducer 1851. The electrowetting cell 1800 may support controlled beam steering, controlled beam shaping or a combination of controlled beam steering and shaping, with respect to light from a field of intended view for the particular optical-to-electrical application of the apparatus 1850.

While light source examples and light detector examples are described separately, it will be understood that both types of optical/electrical transducers 1851 may be present in a single optical apparatus 1850 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern.

In an overall apparatus 1850, with an optical/electrical transducer 1851, the electrowetting cell 1800 may have a lens on one side or the other side or have lenses on both sides, of the electrowetting cell 1800, along the axis of the optical path through the cell 1800 and to or from the transducer 1851. Hence, FIG. 18 shows a dotted line (optional) example of a lens 1853 between the transducer 1851 and the electrowetting cell 1800. Similarly, FIG. 18 shows a dotted line (optional) example of a lens 1855 on the side of the electrowetting cell 1800 opposite the transducer 1851. In the example, the lenses 1851 or 853 would be fixed lenses.

Various examples of arrangements of a spatial optical modulator (e.g. as an electrowetting cell) with one or more cascaded lenses are disclosed in U.S. patent application Ser. No. 15/228,414, filed Aug. 4, 2016, entitled "Configurable Optical Transducers Using An Optical Modulator And One Or More Lenses," the disclosure of which is entirely incorporated by reference.

Although not shown, additional optical processing elements may be provided in the apparatus 1850. In a luminaire for general illumination or in another type of light emission device (e.g. a flash), an emitter type transducer 1851 may be coupled to the electrowetting lens 100 via a collimating optic, such as a total internal reflection (TIR) lens.

A transducer 1851, such as a light emitter or a light detector, often connects to corresponding electrical circuitry to operate the particular type of transducer, e.g. a driver circuit to supply power to an emitter or a sense circuit to process an output signal from a detector (and provide power to the detector if necessary). Hence, to operate the transducer 1851, the controller 1860 includes corresponding driver or sense circuitry 1861. The type of circuitry 1861 would depend on the type of transducer 1851.

The controller 1860 includes an electrowetting (EW) driver 1863 to selectively provide signals to the electrodes (e.g. voltages between respective stepped control channel electrodes and the common electrode) to control the fluid state of the electrowetting cell 1800 using digital techniques, for example. The driver 1863, for example, may include switches; switching circuitry (e.g., switch banks, a digital-to-analog-converter, timing controller, etc.); and a bipolar power supply constructed/configured to apply direct current (DC) voltages or alternating current (AC) voltages or AC with a DC offset to the cell electrodes. In the example 1800 of the cell above, having six stepped control channel electrodes per each of the eight stepped control channel electrode arrays and a common electrode, the EW driver 1863 would have 48 separately controllable voltage output channels each having a connection through a respective contact to a respective one of the 48 total stepped control channel electrodes. Each separately controllable voltage output channel of the EW driver 1863 would also have a connection through the common contact to the common electrode of the electrowetting cell 1800. Configuration of the circuitry of the EW driver 1863 would be adapted to the particular electrical control strategy (e.g. to use AC, DC or a combination of AC and DC), the intended range(s) of fluid states and thus to the beam steering and/or shaping capabilities of the electrowetting cell 1800, and/or to any voltage or current limitations intended to minimize damage to the cell structure of components thereof during operation of the system 1845.

The controller 1860 also includes a processor, one or more digital storage media, data and programming in the storage and appropriate input/output circuitry. Although other processor based architectures may be used (another example is described later regarding FIG. 19), the example of controller 1860 utilizes a Micro-Control Unit (MCU) 1865, which implements the control logic for the controller 1860 and thus of the system 1845. For example, the MCU 1865 implements the logic for control of operations of the associated optical/electrical apparatus 1850. Although shown as controlling only one such apparatus 1850, the MCU and controller may control a number of such apparatuses 1850.

The MCU 1865 may be a microchip device that incorporates a processor 1866 serving as the programmable central processing unit (CPU) of the MCU 1865 as well as one or more memories, represented by memory 1867 in the drawing. The memory 1867 is accessible to the processor 1866, and the memory or memories 1867 store executable programming for the CPU formed by processor 1866 as well as data for processing by or resulting from processing of the processor 1866. The MCU 1865 may be thought of as a small computer or computer like device formed on a single chip. Such devices are often used as the configurable control elements embedded in special purpose devices rather than in a computer or other general purpose device. A variety of available MCU chips, for example, may be used as the MCU 1865 in the controller 1860 of system 1845.

The MCU 1865 in this example also includes various input and output (I/O) interfaces, shown collectively by way of example as interface 1868 in FIG. 18. The I/O interfaces 1868, for example, support a control output to the EW cell driver 1863 as well as a control output and/or input to the driver or sense control circuitry 1861 (for the optical/electrical transducer 1851). The I/O interfaces 1868 also support input/output communications with one or more electronic devices, which may be connected to or incorporated in the system 1845 (e.g. to provide a user interface not shown) or which may be remote.

In the illustrated example, the controller 1860 also includes a communication transceiver (XCVR) 1869 coupled to the processor 1866 (and possibly to the memory 1867) via an I/O output interface 1868 of the MCU 1865. Although shown separately, the transceiver 1869 may be implemented in circuitry on the same chip as the elements of the MCU 1865. Although the drawing shows only one transceiver 1869, controller 1860 may include any number of transceivers, for example, to support additional communication protocols and/or provide communication over different communication media or channels.

The transceiver 1869 supports communication with other control or processing equipment, for example, with a remote user interface device and/or with a host computer of a building control and automation system (BCAS). The transceiver 1869 may also support system communication with a variety of other equipment of other parties having access to the system 1845 in an overall/networked system encompassing a number of similar systems 1845, e.g. for access to each system 1845 by equipment of a manufacturer for maintenance or access to an on-line server for downloading of programming instructions or configuration data for setting aspects of sensing or lighting operation of the associated optical/electrical apparatus(s) 1850. The circuitry of the transceiver 1869 may support such communication(s) over any available medium, such as wire(s), cable, optical fiber, free-space optical link or radio frequency (RF) link.

Figure 19:
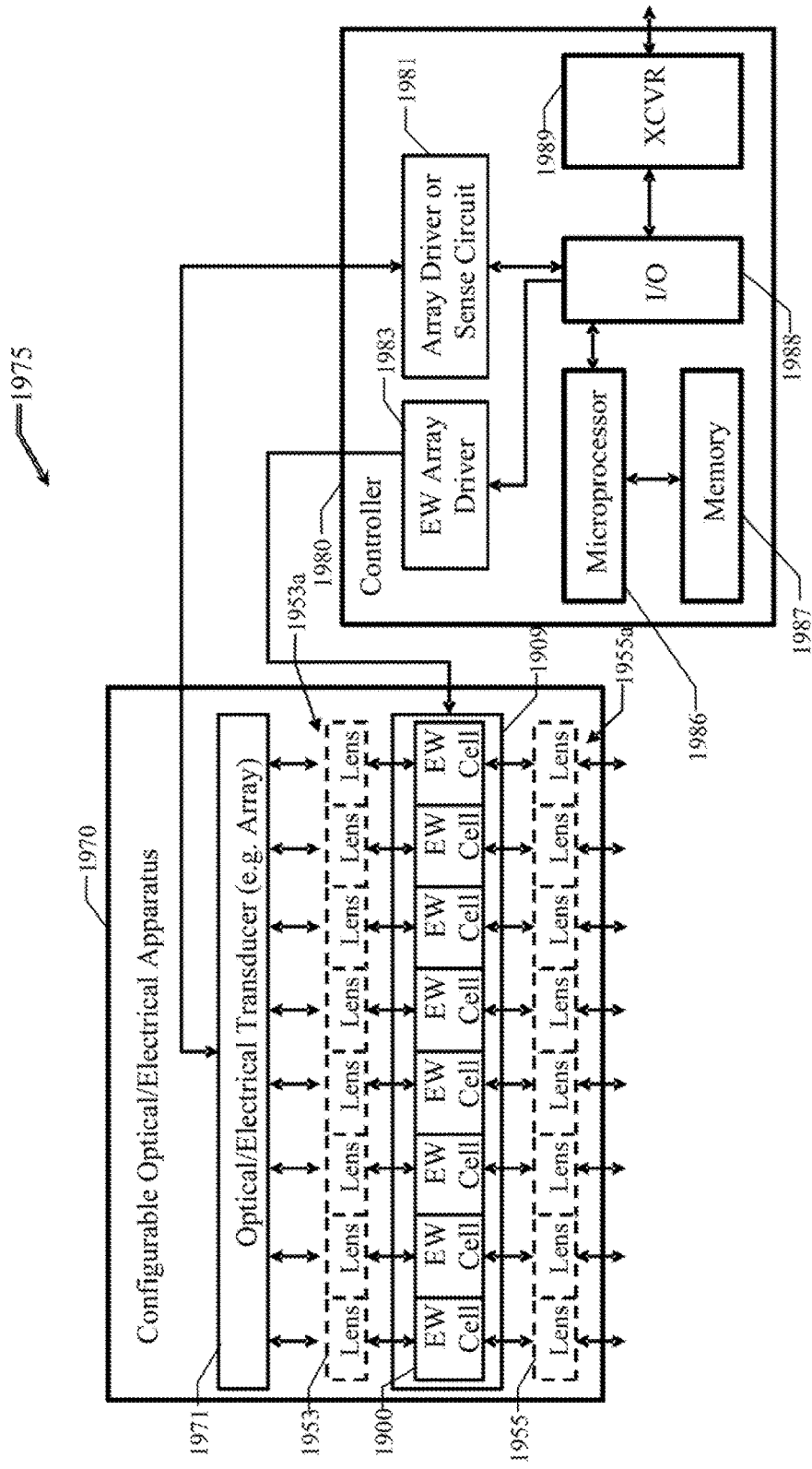
FIG. 19 is a simplified functional block diagram of a system combining an electrowetting cell array like that of FIG. 17 with one or more optical/electrical transducers and associated circuitry.

FIG. 19 is a simplified functional block diagram of a system 1975 combining an electrowetting cell array 1909 like that of FIG. 17 with one or more optical/electrical transducers 1971 (combined in a configurable optical/electrical apparatus 1970). The drawing also depicts an example of associated circuitry, which is implemented in a controller 1980. The electrowetting cellular array 1909 is used to provide selectively controllable beam steering and/or beam shaping for any of a variety of types of optical/electrical transducers 1971, including both light detectors and light emitters. The controller 1980 may be included in the apparatus 1970, or the controller 1980 may be somewhat separate from or even remote from the configurable optical/electrical apparatus 1970.

The optical/electrical transducer 1971 may be any transducer device of the types discussed above, although the transducer 1971 is configured to operate with an array 1909 of electrowetting cells 1900. Although the transducer 1971 may be a single device, e.g. a single relatively large light source, in many examples, transducer 1971 is an array of emitters and/or lighting input responsive devices (e.g. detectors or photovoltaic devices). In a luminaire example using the apparatus 1970, the transducer 1971 might include an array of high intensity LED light emitters, where each one of the emitters is coupled to one or more of the cells 1900 of the array 1909. In a detector example using the apparatus 1970, the transducer 1971 might include a complementary metal-oxide-semiconductor (CMOS) image sensor, a charge-coupled device (CCD) image sensor or other image detector array like any of those used in digital cameras. Each actual detector at a pixel of the image sensor array could be coupled to one or more of the cells 1900 of the array 1909.

In an apparatus 1970, with an optical/electrical transducer 1971, the electrowetting cell array 1909 may have one or more lenses on one side or the other side or have lenses on both sides, of the electrowetting cell array 1909, along the axis of the optical path through the cell array 1909 and to or from the transducer 1971. Although there may be more or fewer lenses than there are cells 1900 in the array 1909, we will consider lens array arrangements, e.g. in which a lens array 1953*a* or 1955*a* has a lens 1953 or 1955 coupled to each cell 1900 of the array 1909. Hence, FIG. 19 shows a dotted line (optional) example of a lens array 1953*a* between the transducer 1971 and the electrowetting cell array 1909. Similarly, FIG. 19 shows a dotted line (optional) example of a lens array 1955*a* on the side of the electrowetting cell array 1909 opposite the transducer 1971. In the example, the lenses 1951 or 1953 would be fixed lenses.

Although the array structure(s) are different, various examples of arrangements of a controllable electrowetting array with one or more cascaded lenses are disclosed in U.S. patent application Ser. No. 15/389,829, filed Dec. 23, 2016, entitled "Electrowetting Cellular Array And Luminaire Incorporating The Array," the disclosure of which is entirely incorporated by reference.

Although not shown, additional optical processing elements may be provided in the apparatus 1970. In a luminaire for general illumination or in another type of light emission device (e.g. a flash), each emitter type transducer in an array implementation of the transducer 1971 may be coupled to one or more of the electrowetting lenses 1900 of array 1909 via a collimating optic, such as a total internal reflection (TIR) lens.

A transducer 1971, such as a light emitter or a light detector, often connects to corresponding electrical circuitry to operate the particular type of transducer, e.g. a driver circuit array to supply power to each emitter of an emitter array or sense circuitry to process output signals from the detectors (and provide power to the detectors if/when necessary). Hence, to operate the transducer 1971, the controller 1980 includes corresponding an array driver or sense circuit 1981. The type of circuitry 1981 would depend on the type of transducer 1971, e.g. the particular array of emitters of a display or multi-pixel luminaire type source or the particular type of image sensor array.

The controller 1980 includes an electrowetting (EW) driver 1983 to selectively provide signals to the electrodes (e.g. voltages between respective stepped control channel electrodes and the common electrode) to control the fluid state of each electrowetting cell 1900 of the array 1909. As outlined earlier, the driver 1983 may be connected to control all of the cells 1900 as a single group, as some number of sub-groups (e.g. lines or sub-matrices), or as individual controllable optics.

The driver 1983, for example, may include circuitry constructed/configured to apply direct current (DC) voltages or alternating current (AC) voltages or AC with a DC offset to electrodes of each cell or in common to the electrodes of some number of the cells of the array 1909. If all cells are controlled in common, the circuitry of the driver 1983 may be similar to that of the driver 1963 discussed above, although driver 1983 may have a higher power capacity to drive more cells in common. If cells are controlled individually, the driver 1983 may include circuitry of a driver similar to that of the driver 1963 discussed above, for each cell 1900 of the array 1909 or multiplexing circuitry to supply drive signals to the various cells from one or a small number of individual drivers (e.g. on a sequential basis). In a system implementation where sets of one or more lines or sub-matrix groups of cells are controlled in common, the driver 1983 may include circuitry of a driver similar to that of the driver 1963 discussed above, for each group of cells 1900 of the array 1909 that are to be commonly controlled. The separate drivers in this later implementation, however, would allow independent control of the different groups of cells within the array 1909. Multiplexing may also be used to independently drive the various groups of cells 1900.

The controller 1980 also includes a processor, which in this example, is implemented by a microprocessor 1986. The microprocessor 1986 is programmed to implement control and other processing functions of a central processing unit (CPU) of the controller 1980. The microprocessor 1986, for example, may be based on any known or available microprocessor architecture, such as a Reduced Instruction Set Computing (RISC) using ARM architecture, as commonly used today in mobile devices and other portable electronic devices. Of course, other microprocessor circuitry may be used to form the CPU of the controller 1980. Although the illustrated example includes only one microprocessor 1986, for convenience, a controller 1980 may use a multi-processor architecture.

The controller 1980 also includes one or more digital storage media, represented by the memory 1987, for storage of data and programming. The storage media represented by the memory 1987 may include volatile and/or non-volatile semiconductor memory, any suitable type of magnetic or optical storage media, etc. The microprocessor 1986 implements the control logic for the controller 1980 and thus of the system 1975, based on executable instructions of the programming, which in the example is stored in the memory 1987. The executable instructions may be firmware or software instructions, to configure the microprocessor 1986 to perform electrowetting control operations, lighting control operations or light detection operations, etc. Based on execution of the program instructions, the microprocessor 1986, for example, implements the logic for control of operations of the transducer 1971 and the cellular electrowetting array 1909, in the associated optical/electrical apparatus 1970. Although shown as controlling only one such apparatus 1970, the microprocessor 1986 and thus the controller 1980 may control a number of such apparatuses 1970.

Although shown in simplified block form, the architecture of controller 1980 may be similar to that of any of a variety of types of types of other smart electronic devices, such as an architecture for a personal computer or an architecture for a mobile terminal device.

The processor 1866 of the MCU 1865 (FIG. 18) and the microprocessor 1986 (FIG. 19) are examples of processors that may be used to control an electrowetting cell or array of such cell and control or respond to outputs of any associated optical/electrical transducer(s). As used herein, a processor is a hardware circuit having elements structured and arranged to perform one or more processing functions, typically various data processing functions. Although discrete logic components could be used, the examples utilize components forming a programmable central processing unit (CPU). A processor for example includes or is part of one or more integrated circuit (IC) chips incorporating the electronic elements to perform the functions of the CPU.

The processor 1866 or the microprocessor 1986 executes programming or instructions to configure the system 1845 or 1975 to perform various operations. For example, such operations may include various general operations (e.g., a clock function, recording and logging operational status and/or failure information) as well as various system-specific operations (e.g. controlling beam steering and beam shaping of input or output light, operation of the transducer (s) and the like) of an optical/electrical apparatus 1860 or 1980 incorporating one or more of the electrowetting cells and associated transducer(s). Although a processor may be configured by use of hardwired logic, typical processors in lighting devices are general processing circuits configured by execution of programming, e.g. instructions and any associated setting data from the memories shown or from other included storage media and/or received from remote storage media.

As outlined above, a class of applications of the cell 1900 with suitable light source type transducers provide configurable luminaires. The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below. Other large format lighting applications for the electrowetting cell constructs include vehicle lighting or the like.

Figure 20B:
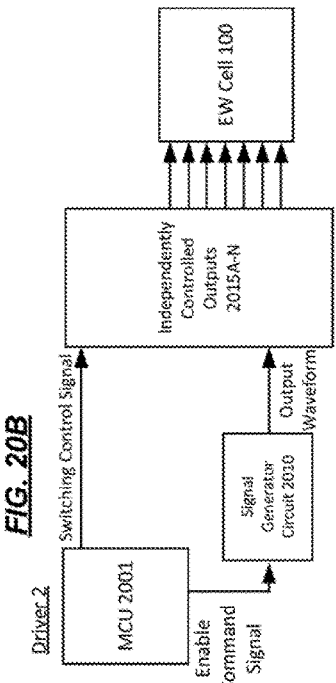
FIGS. 20A-C depict exemplary layouts for a driver of the electrowetting cell, which include a driver with independently controlled outputs.
Figure 20A:
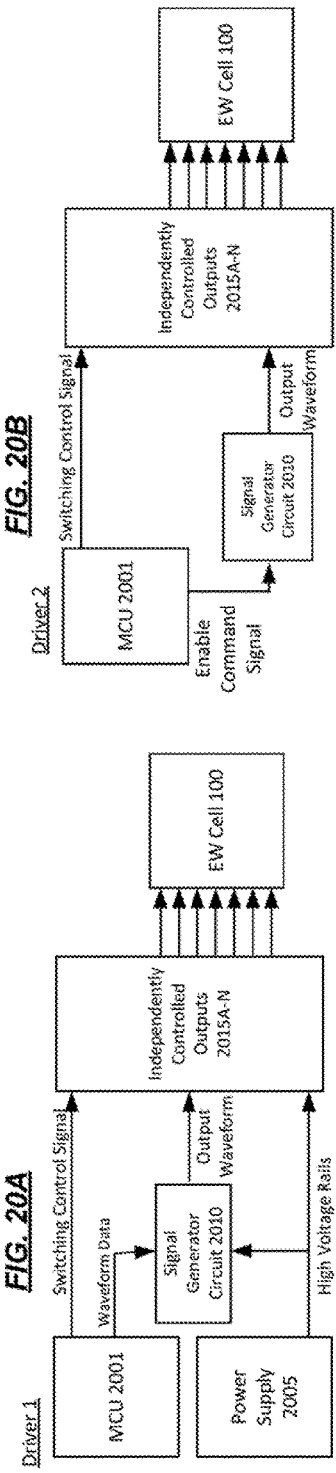
Figure 20C:
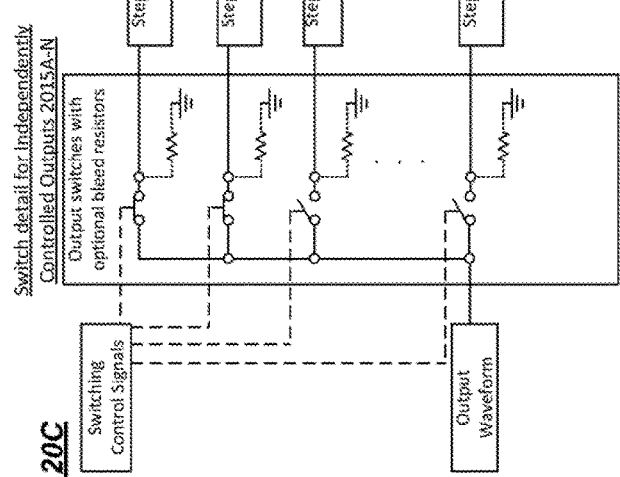

FIGS. 20A-C depict exemplary layouts for a driver of the electrowetting cell 100, which include a driver with switching circuitry and independently controlled outputs 2015A-N. For controlling each of the stepped control channel electrodes 115A-N of the electrowetting cell 100, the drivers include electronic circuitry with independently controlled outputs 2015A-N. The independently controlled outputs 2015A-N can be switches, relays, multiplexers, demultiplexers, transistor networks, or a combination thereof. As shown, two general circuit layouts for drivers 1 and 2 are shown in FIGS. 20A-B, respectively, for driving a stepped electrode type electrowetting cell 100. Driver 1 of FIG. 20A includes several circuitry blocks: microcontroller unit (MCU) 2001, power supply 2005, signal generator circuit 2010, which collectively comprise the switching circuitry. Driver 1 also includes independently controlled outputs 2015A-N. As shown, driver 1 is coupled to the electrowetting cell 100. Each block has a basic function, but can be designed in different ways.

The power supply 2005 generates the bipolar voltage levels needed, depending on the input voltages to the circuit. In general, if a DC source is utilized, the power supply circuit 2005 can be a boost converter/low dropout (LDO) regulator (positive rail) with a charge pump (negative rail) or a dual output boost converter or a flyback and inverting flyback converter circuit. If an AC source is used, the power supply 2005 can be a rectifying circuit and an inverting circuit, or a center tap transformer into a rectifying circuit or switching AC-to-DC supply.

The MCU 2001 is the controller of the drivers of FIGS. 20A-B. MCU 2001 includes a microcontroller or microprocessor and can further include electrostatic discharge (ESD) protection, user interfacing capability with either a physical connection (cables—USB, Ethernet, etc.), wireless connectivity (Bluetooth, radio frequency (RF) id, etc.), or general input/output (IO), and memory. MCU 2001 enables the power supply 2005, controls the independently controlled outputs 2015A-N, and generates the output waveform data to a signal generator circuit 2010. The waveform data can be generated either as preset serial commands, a set waveform with this amplitude and frequency in which case the signal generator circuit 2010 has an enabling input line which is controlled by an enable command input signal from the MCU 2001. Or the waveform data can be an active waveform generation where the MCU 2001 is actively generating the waveform at a select frequency and only sending the desired amplitude of the waveform to the signal generator circuit 2010.

The signal generator circuit 2010 translates the enable command input signal or waveform data from the MCU 2001 to create a suitable analog waveform. Signal generator circuit 2010 can include a waveform generating integrated circuit (IC), or a digital to analog converter (DAC) and an operational amplifier. In the case of a waveform generating IC type signal generator circuit 2010, the MCU 2001 instructs the signal generator circuit 2010 to start creating the waveform by setting the amplitude and frequency of the desired waveform. The output of the signal generator circuit 2010 is amplified by the operational amplifier and then fed into the output switches/relays 2015A-N. In the case of a DAC type signal generator circuit 2010, the MCU 2001 is actively setting the waveform amplitude levels (either by timing or interrupt firmware routines) and the DAC converts this waveform data (generally an 8-16 bit value) to an analog amplitude level which then feeds into the operational amplifier and finally the output switches/relays 2015A-N. The timing of the MCU data sent determines the waveform frequency and if the MCU 2001 stops sending the waveform data, the output signal stops generating.

The independently controlled outputs 2015A-N handle the amplitudes of the output waveform needed to drive the electrowetting cell 100 that are inputted. The independently controlled outputs 2015A-N can be solid state switches/relays, opto-isolators, multiplexer/demultiplexers, mechanical relays or a transistor network that facilitates the output waveforms, as needed. The independently controlled outputs 2015A-N are controlled by the MCU 2001 as either direct control (1 input/output (IO) channel from MCU 2001 per independently controlled output 2015A-N), or by serial commands that correspond to the independently controlled outputs 2015A-N.

For the driver 2 option of FIG. 20B, the power supply circuit 2005 of FIG. 20A can be removed entirely from the design and the signal generator circuit 2010 can be a high voltage type signal generator circuit. The high voltage type signal generator circuit 2010 can include a variety of waveform generating integrated circuits (e.g., electroluminescent driver integrated circuits). The high voltage type signal generator circuit 2010 receives input waveform data, which is the enable command signal, from the MCU 2001 and directly generates and outputs the desired waveform to feed into the output switches/relays 2015A-N.

The switch detail of FIG. 20C depicts the independently controlled outputs 2015A-N from the blocks of FIGS. 20A-B. A waveform is fed into each output switch/relay 2015A-N and then the switching control signals are used to switch the individual switches on (closed) or off (open) and then each switch is connected to an individual stepped electrode 115A-N of the electrowetting cell 100. Also shown are optional bleed resistors which are not necessary, however, the bleed resistors can allow for better performance as bleed resistors eliminate the possibility of floating potentials on the stepped electrodes 115A-N. Bleed resistors are shown with dotted lines because the bleed resistors can either be built into the independently controlled outputs 2015A-N, or added externally if specific resistance values differ from those offered from a switch bank integrated circuit, for example, as desired.

In the example drivers, the independently controlled outputs 2015A-N are coupled to the micro-control unit 2001. Each independently controlled output 2015A-N is operated by the micro-control unit 2001 and coupled to a respective stepped control channel electrode 115A-N. Each independently controlled output 2015A-N is configured to turn on or off based on a respective switching control signal from the micro-control unit 2001. Based on the respective switching control signal, each independently controlled output 2015A-N is configured to control an applied voltage to the respective stepped control channel electrode 115A-N. The applied voltage switches between on or off voltage levels.

The micro-control unit 2001 can be configured to send an enable command signal to the output signal generator 2010 to enable or disable the output signal generator 2010 to output an analog output waveform. The output signal generator 2010 is configured to output the analog waveform to be inputted to the independently controlled outputs 2015A-N based on the enable command signal being enabled.

In another example, the output signal generator 2010 includes a digital to analog converter coupled to the micro-control unit 2001. The digital to analog converter of the output signal generator 2010 is configured to generate an analog output waveform inputted to the independently controlled outputs 2015A-N with an amplitude level based on digital amplitude waveform data received from the micro-control unit 2001.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

Artificial light output from a luminaire may carry information, such as a code (e.g. to identify the luminaire or its location) or downstream transmission of communication signaling and/or user data. The light based data transmission may involve modulation or otherwise adjusting parameters (e.g. intensity, color characteristic or optical spatial distribution) of the illumination light output from the device.

Another class of applications for the electrowetting cell relate to sensing applications. A sensing application typically combines a detector type transducer with one or more electrowetting. The detector, for example, may be a single light responsive component, a combination of several light responsive components detecting the same or different light characteristics, or a pixel array of light detectors (e.g. for image sensing). Although some photovoltaic devices may output power in response to optical energy, sensors typically involve some processing circuitry to operate the particular type of detector.

Displays and a variety of other applications of the electrowetting cell also are within the scope of the disclosure above.

In the examples of shown FIGS. 12-16, both first and second plates and the associated end walls where light enters or exits can be transparent. As a result, the electrowetting cell allows passage of light through the fluids within the cell, for example along and about the optical axis A. Light passing through such a cell may be refracted as a result of passage through the fluids in an amount dependent on the shape of the meniscus between the fluids, which is electrically controllable and refractive index difference between the fluids. Passage and such refraction of light through the cell may apply to light entering the cell in either direction, e.g. through either of the first and second plates and associated end walls. In such a cell, refracted light similarly may emerge from the cell in either direction, e.g. through either of the first and second plates and associated end walls.

Hence, the examples shown and described above relate to a light transmissive electrowetting cell, that is to say a cell that acts as a lens and/or prism and is relatively transparent with respect to light that passes entirely through the optically active area of the cell. Teachings herein may also relate to reflective electrowetting cells, for example, as described in FIGS. 1-11. For a reflective cell, a reflector could either be at one end of the well (distal end or the first plate covering the opening of the well) or at the meniscus forming the interface of the two fluids. Alternatively, one of the fluids could be reflective, in which case that fluid itself could be used as reflector without adding any extra reflector.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
a driver; and
an electrowetting cell controlled by the driver and including:
   a substrate that includes a well filled with at least two non-mixing media, the well having a plurality of lateral walls; and
   a stepped control channel electrode matrix including a plurality of stepped control channel electrode arrays; wherein:
     each stepped control channel electrode array includes a plurality of stepped control channel electrodes formed at different longitudinal levels along a respective lateral wall; and
     each stepped control channel electrode is independently controllable by the switching circuitry to control a shape of the at least two non-mixing media via an electric field.

2. The system of claim 1, wherein:
each lateral wall encloses the at least two non-mixing media inside the well from a respective side of the well; and
the two non-mixing media are at least two immiscible fluids, or at least one fluid and a gas.

3. The system of claim 2, wherein:
each of the plurality of stepped control channel electrode arrays is formed vertically along a height of the respective lateral wall; and
the different longitudinal levels of the plurality of stepped control channel electrodes of each stepped control channel electrode array are positioned at varying vertical distances along the height of the respective lateral wall.

4. The system of claim 1, wherein:
the plurality of lateral walls form a perimeter of the well; and
the perimeter is shaped as a circle, oval, semi-circle, or polygon.

5. The system of claim 1, wherein each stepped control channel electrode is comprised of at least one conductive layer.

6. The system cell of claim 5, wherein:
each stepped control channel electrode further comprises a dielectric material; and
the at least one conductive layer is covered by the dielectric material.

7. The system cell of claim 1, wherein each stepped control channel electrode is comprised of a conductive coating shaped via laser ablation.

8. The system of claim 1, further comprising:
a plurality of stepped control channel gaps formed between the stepped control channel electrode arrays to longitudinally divide the plurality of lateral walls of the well; and
a plurality of level spaces formed horizontally between each of the stepped control channel electrodes of a respective stepped control channel electrode array.

9. The system of claim 8, wherein:
the plurality of stepped control channel gaps insulate each of the stepped control channel electrode arrays from each other.

10. The system of claim 8, wherein:
the plurality of level spaces insulate each of the stepped control channel electrodes of the respective stepped control channel electrode array from each other.

11. The system of claim 1, wherein the driver includes:
a plurality of independently controlled outputs coupled to a micro-control unit, each independently controlled output operated by the micro-control unit and coupled to a respective stepped control channel electrode.

12. The system of claim 11, wherein:
each independently controlled output is configured to turn on or off based on a respective switching control signal from the micro-control unit.

13. The system of claim 12, wherein:
based on the respective switching control signal, each independently controlled output is configured to control an applied voltage to the respective stepped control channel electrode, the applied voltage switching between on or off voltage levels.

14. The system of claim 12, wherein the driver further includes:
an output signal generator;
the micro-control unit is configured to send an enable command signal to the output signal generator to enable or disable the output signal generator to output an analog output waveform; and
the output signal generator is configured to output the analog waveform to be inputted to the independently controlled outputs based on the enable command signal being enabled.

15. The system of claim 12, wherein the driver further includes:
a digital to analog converter coupled to the micro-control unit and configured to generate an analog output waveform inputted to the independently controlled outputs with an amplitude level based on digital amplitude waveform data received from the micro-control unit.

16. The system of claim 11, wherein:
the independently controlled outputs are switches, relays, multiplexers, demultiplexers, or transistors.

17. The system of claim 1, further comprising:
at least one external contact surface; and
a respective stepped control channel electrode connection pad on the at least one external contact surface for each respective stepped control channel electrode.

18. The system of claim 17, further comprising:
a respective stepped control channel electrode interconnect connected to each respective stepped control channel electrode and the respective stepped control channel electrode connection pad.

19. The system of claim 18, further comprising:
a common electrode connection pad on the at least one external contact surface; and
a circuit board coupled to the external contact surface and having circuit connections in electrical contact with each respective stepped control channel electrode connection pad and the common electrode connection pad to selectively supply an applied voltage to each respective stepped control channel electrode.

20. The system of claim 19, wherein:
the external contact surface comprises two or more surfaces outside of the well and away from a sealing surface where the electrowetting cell is filled with the at least two non-mixing media.

* * * * *